United States Patent [19]

Matsuyama

[11] Patent Number: 5,615,398
[45] Date of Patent: Mar. 25, 1997

[54] OPTICAL APPARATUS WITH IMAGE AREA SENSORS FOR CONTROLLING LENS FOCAL LENGTH

[75] Inventor: Shinichi Matsuyama, Tokyo, Japan

[73] Assignee: Canon Kabushiki Kaisha, Tokyo, Japan

[21] Appl. No.: 332,870

[22] Filed: Nov. 1, 1994

[30] Foreign Application Priority Data

Nov. 8, 1993 [JP] Japan ........................... 5-278432
Nov. 8, 1993 [JP] Japan ........................... 5-278433

[51] Int. Cl.⁶ .......................... G03B 3/00; G03B 13/18
[52] U.S. Cl. ............................... 396/77; 396/128
[58] Field of Search ...................... 354/404, 408, 354/481; 396/77, 128; 348/240, 358, 369

[56] References Cited

U.S. PATENT DOCUMENTS 3,185,052  11/1961  Baron .......................... 354/481
5,089,841  2/1992   Yamada ........................ 354/402
5,315,341  5/1994   Hibbard ....................... 354/402

Primary Examiner—Howard B. Blankenship
Attorney, Agent, or Firm—Robin, Blecker, Daley & Driscoll

[57] ABSTRACT

An optical apparatus includes an image pickup part arranged to convert a light flux representative of an object image into an image signal, a detecting part arranged to detect information on the object image by using the image signal, a discriminating part arranged to discriminate the size of a main object by using the information on the object image detected by the detecting part, and a deciding part which decides, on the basis of a discrimination made by the discriminating part, a focal length of an optical system to be changed.

20 Claims, 25 Drawing Sheets a b c

FIG. 27
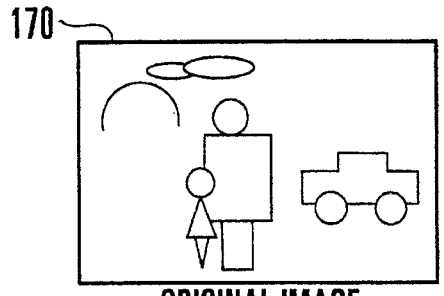
170 ORIGINAL IMAGE
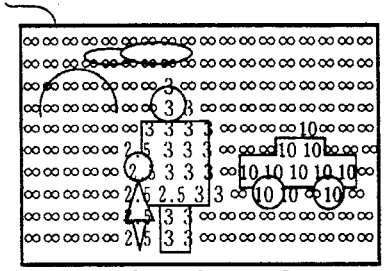
171 DISTANCE IMAGE
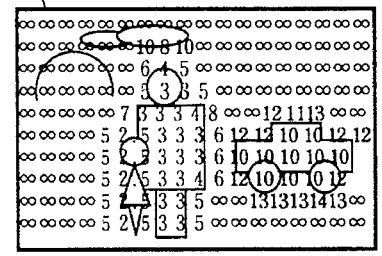
172 DISTANCE IMAGE AFTER FILTER PROCESSING
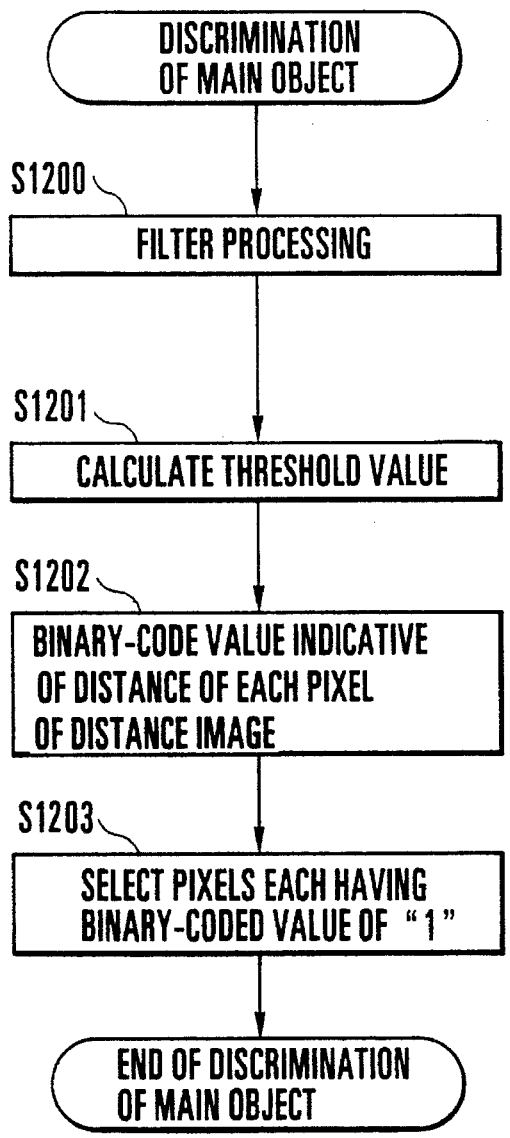
DISCRIMINATION OF MAIN OBJECT
S1200 FILTER PROCESSING
S1201 CALCULATE THRESHOLD VALUE
S1202 BINARY-CODE VALUE INDICATIVE OF DISTANCE OF EACH PIXEL OF DISTANCE IMAGE
S1203 SELECT PIXELS EACH HAVING BINARY-CODED VALUE OF "1"
END OF DISCRIMINATION OF MAIN OBJECT
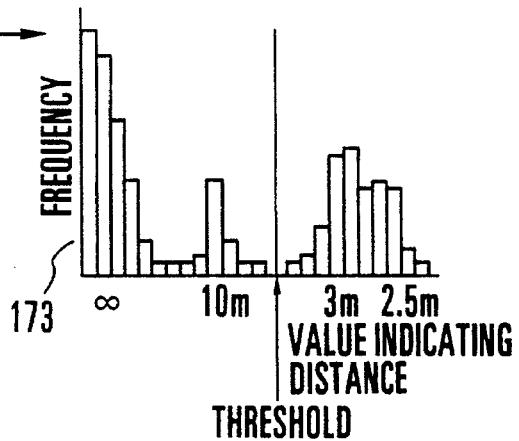
173 VALUE INDICATING DISTANCE THRESHOLD
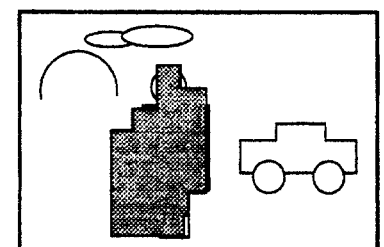
174

2

OPTICAL APPARATUS WITH IMAGE AREA SENSORS FOR CONTROLLING LENS FOCAL LENGTH

BACKGROUND OF THE INVENTION

1. Field of the Invention

This invention relates to an optical apparatus arranged to decide on the basis of an object image a focal length to be changed.

2. Description of the Related Art

A so-called automatic zoom device or a camera of the kind arranged to keep a photographic magnification unchanged or to automatically set a focal length has heretofore necessitated setting beforehand, by some means, the photographic magnification to be kept unchanged or information related to the photographic magnification. It has been arranged, in some cases, to obtain the desired photographic magnification by first detecting an object distance and then by deciding a focal length according to the object distance. Such an arrangement has been disclosed, for example, in U.S. Pat. No. 5,173,807.

In the conventional arrangement mentioned above, however, a focal length is decided solely according to the object distance. Therefore, it has been impossible to obtain an angle of view apposite to the object of shooting unless the object is an object anticipated or the size of the object is approximately the same as that of the object anticipated.

SUMMARY OF THE INVENTION

It is a principal object of this invention to provide an optical apparatus which is arranged to judge the size of the object of shooting by using the object image extracted by image detecting means and to carry out zooming on the basis of the judged size of the object.

The above and other objects and features of this invention will become apparent from the following detailed description of embodiments thereof taken in conjunction with the accompanying drawings.

BRIEF DESCRIPTION OF THE DRAWINGS

FIG. 27 shows the details of an operation of discriminating a main object in the fifth embodiment.

DETAILED DESCRIPTION OF THE PREFERRED EMBODIMENT (First Embodiment)

Figure 1:
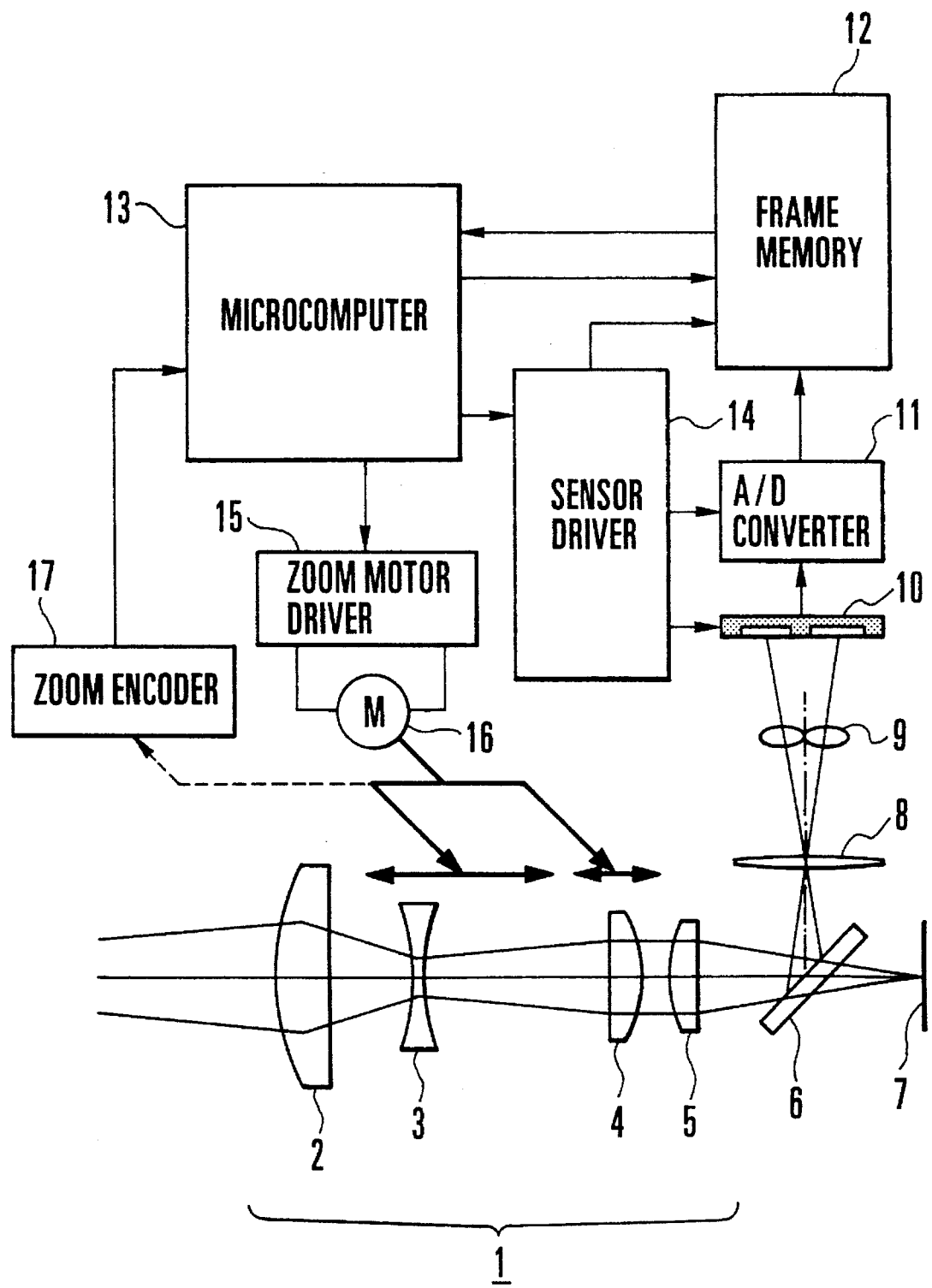
FIG. 1 is a block diagram showing an automatic zoom device of a camera arranged according to this invention as a first embodiment thereof.

FIG. 1 shows an automatic zoom device of a camera arranged as a first embodiment of this invention.

In FIG. 1, reference numeral 1 denotes a photo-taking lens of the camera. The photo-taking lens 1 consists of a focusing lens 2, a variator lens 3, a compensator lens 4 and a relay lens 5. The variator lens 3 and the compensator lens 4 are arranged to be driven for zooming in the direction of an optical axis by a zoom motor 16 using cam means or the like. A quick-return mirror 6 is arranged to swing. A film surface 7 is located within the camera. Reference numeral 8 denotes a field lens. Reference numeral 9 denotes a pair of secondary image forming lenses. An area sensor 10 includes a pair of image pickup planes for generating image signals. An A/D converter 11 is arranged to convert the image signals outputted from the area sensor 10 into digital image signals. A frame memory 12 is arranged to store the digital image signals. A microcomputer 13 is arranged to control the area sensor 10, the A/D converter 11 and the frame memory 12 through a sensor driver 14 to obtain the image signals and to control zooming on the basis of the image signals thus obtained. The sensor driver 14 is arranged to drive the area sensor 10, to give a conversion timing signal to the A/D converter 11 and to give a data take-in timing to the frame memory 12, in accordance with the instructions from the microcomputer 13. A zoom motor driver 15 is arranged to act, according to an instruction from the microcomputer 13, to drive the zoom motor 16 to zoom the photo-taking lens 1. The zoom motor 16 is arranged to perform zooming by moving the variator lens 3 and the compensator lens 4 in the direction of the optical axis through the driving means (cam means) (not shown). A zoom encoder 17 is arranged to detect the movement and position (focal length) of zooming.

Figure 2:
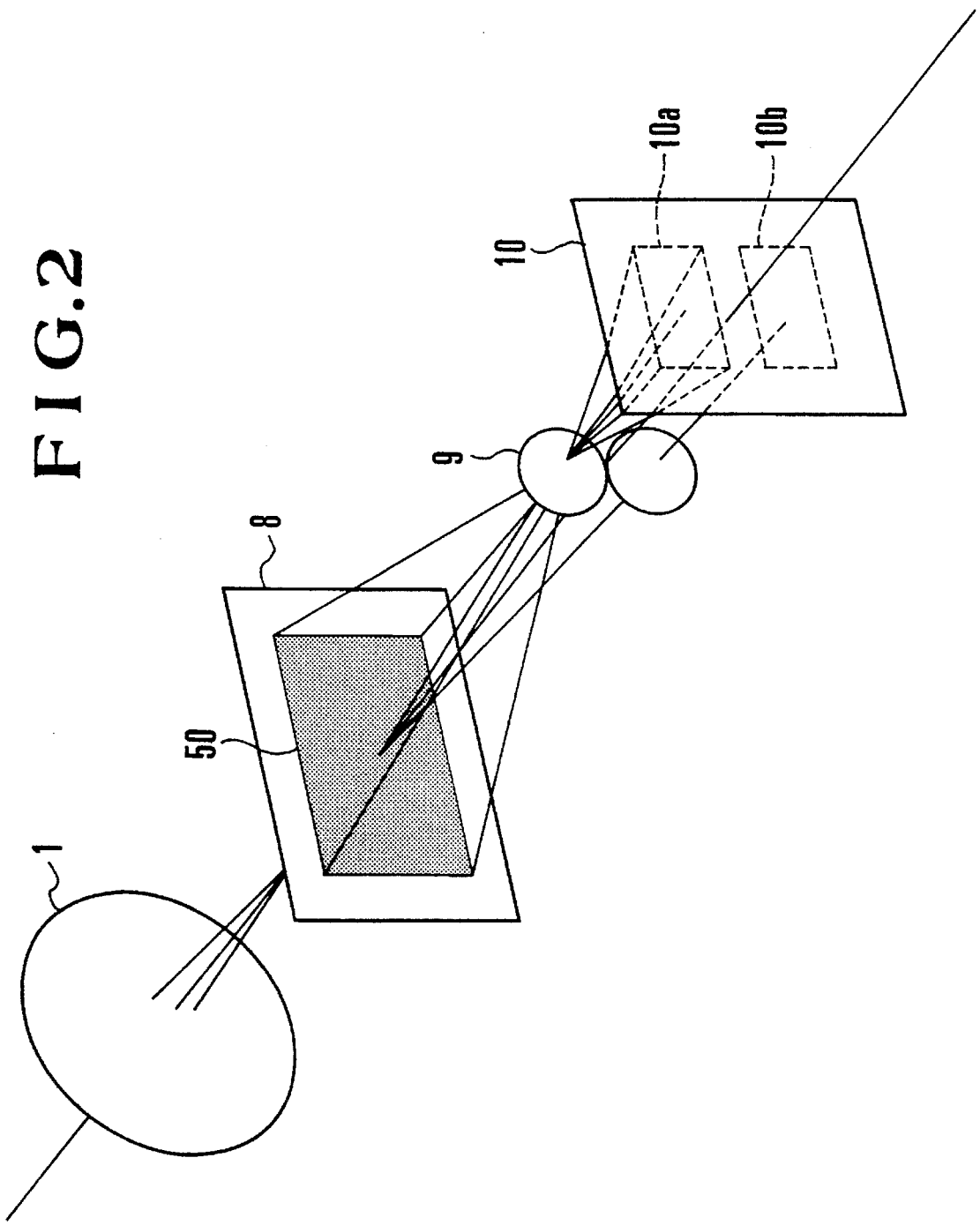
FIG. 2 shows the relation of optical positions of component parts of the automatic zoom device of the camera arranged as the first embodiment.

FIG. 2 shows the relation of optical positions of the photo-taking lens 1, the field lens 8, the secondary image forming lenses 9 and the area sensor 10 of the automatic zoom device shown in FIG. 1. Light fluxes coming from different pupil positions of the photo taking lens 1 are led to the surfaces of the two image pickup planes 10a and 10b of the area sensor 10. The two light fluxes are re-imaged through the field lens 8 and the secondary image forming lenses 9 at an image magnifying rate β. A distance between the two images thus formed on the image pickup planes 10a and 10b depends on the state of defocus of the photo-taking lens 1. Further, in FIG. 2, an image forming plane 50 is located in an image pickup optical path and is optically equivalent to the film surface 7 with respect to the photo-taking lens 1. Each of the image pickup planes 10a and 10b is of a size which is β times as large as the size of the image forming plane 50. In other words, each of the image pickup planes 10a and 10b has a visual field which is equal to a photo-taking image plane.

Figure 3:
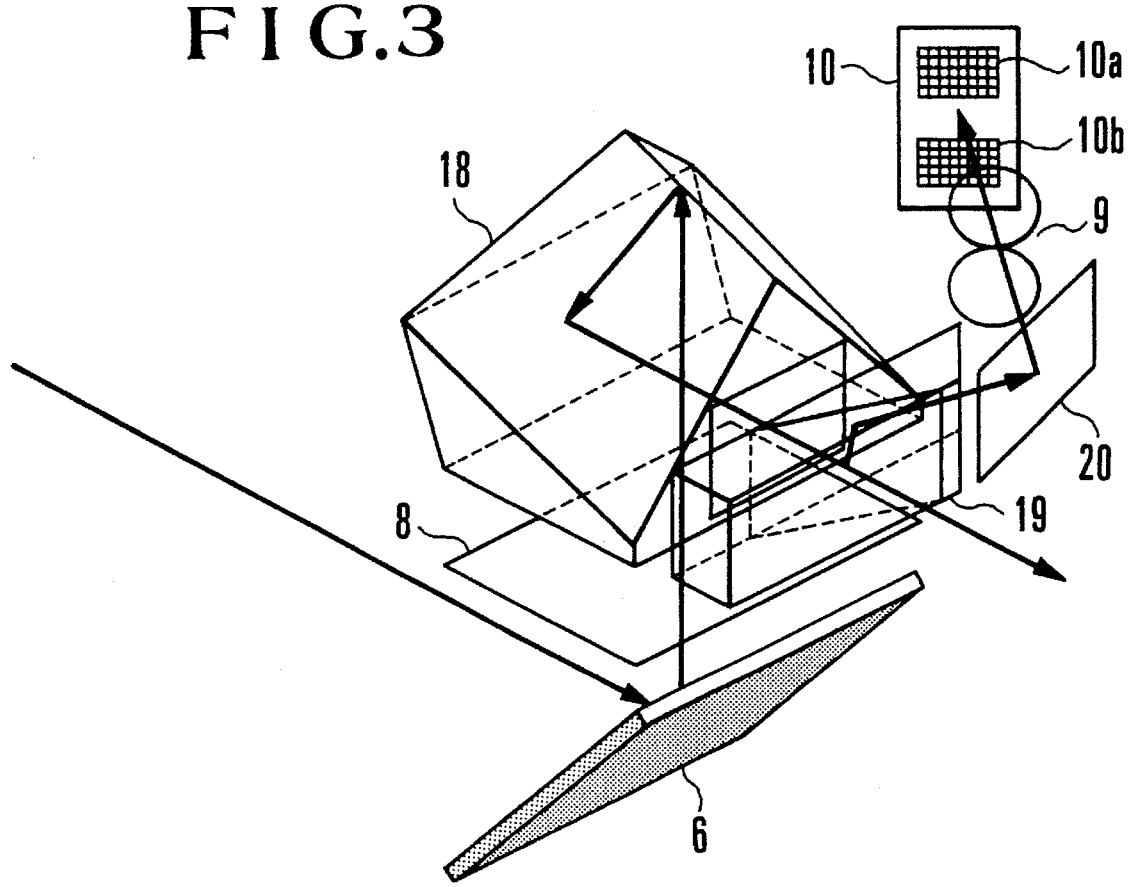
FIG. 3 shows the layout of the automatic zoom device of the first embodiment obtained when the device is applied to a single-lens reflex camera.

FIG. 3 shows a layout of the automatic zoom device of the camera in a state of being applied to a single-lens reflex camera. The illustration includes a pentagonal prism 18, a beam splitting prism 19 and a reflection mirror 20. Reference numerals 6, 8, 9 and 10 denote the same as those shown in FIGS. 1 and 2.

Figure 4:
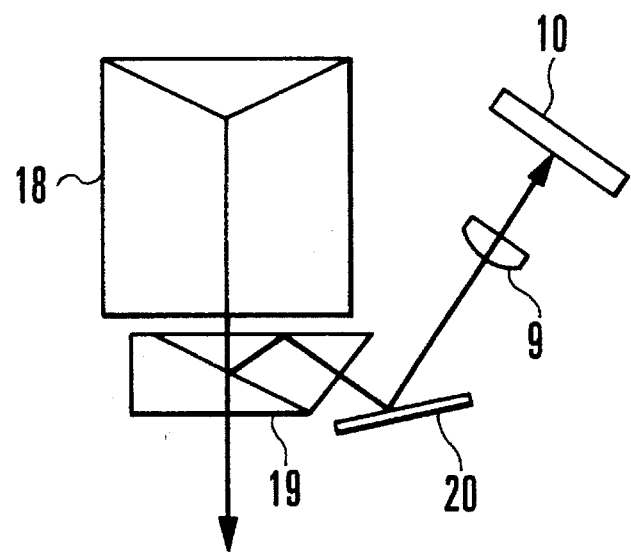
FIG. 4 shows the layout of FIG. 3 as viewed from above the camera.

FIG. 4 shows the layout of FIG. 3 as viewed from above the camera.

Figure 5:
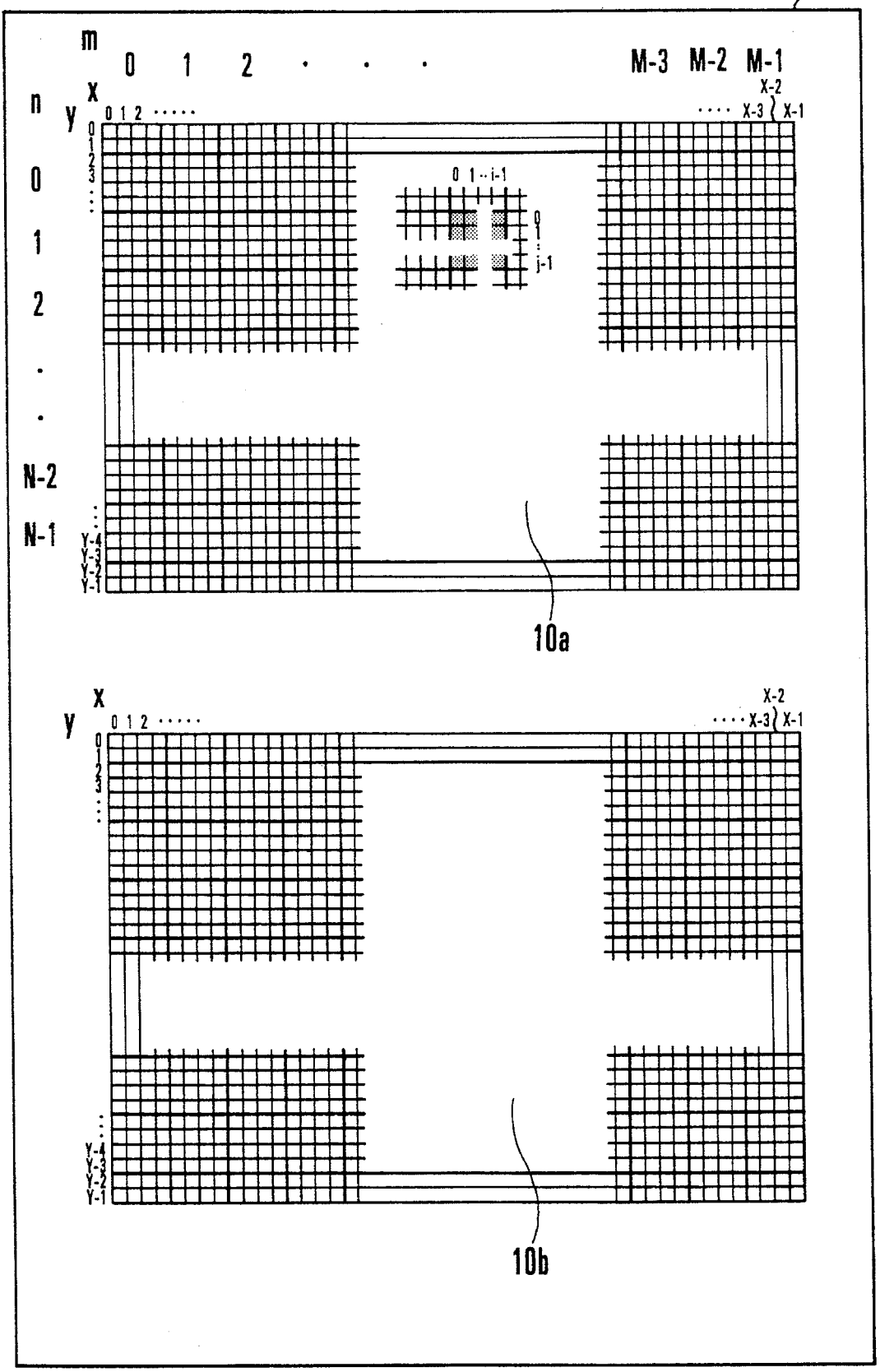
FIG. 5 shows a pair of image pickup planes of an area sensor and the arrangement of pixels.

FIG. 5 shows the image pickup planes 10a and 10b of the area sensor 10 and the arrangement of pixels on the image pickup planes 10a and 10b. X pixels are horizontally arranged while Y pixels are vertically arranged on each of the two image pickup planes 10a and 10b. Further, on the image pickup plane 10a, M computation blocks are horizontally arranged while N computation blocks are vertically arranged. Each of the computation blocks includes i pixels in the horizontal direction and j pixels in the vertical direction.

With the embodiment arranged in the above-stated manner, a light flux comes from an object of shooting to be incident on the photo-taking lens 1. The direction of the incident light flux is turned upward by the quick-return mirror 6 and forms an image in the neighborhood of a distance which is optically equivalent to the film surface 7. The imaged light flux passes through the field lens 8 to be led to the pentagonal prism 18. The direction of the light flux is then changed to go out from the rear of the pentagonal prism 18 and is split by the beam splitting mirror 19. A part of the light flux is then led to a viewfinder field. The rest of the light flux is reflected sideways toward the pair of secondary image forming lenses 9. The secondary image forming lenses 9 then act on the light fluxes coming from different pupil positions of the photo-taking lens 1 through the above-stated arrangement so as to form images respectively on the image pickup planes 10a and 10b of the area sensor 10. A distance between the two images varies with the amount of defocus of the photo-taking lens 1.

The microcomputer 13 shown in FIG. 1 operates as described below with reference to FIGS. 6, 7, 8 and 9 which are flow charts.

At a step S1 data "$f_{n-1}$" indicating an apposite focal length which has been obtained the last time for the photo-taking lens 1 according to the size of a main object, etc., is set, as initial setting, at a value corresponding to the shortest focal length (obtained at a wide-angle end position) of the photo-taking lens 1.

At a step S2, the zoom motor driver 15 is caused to drive the zoom motor 16 to move, through the driving means (cam means), the variator lens 3 and the compensator lens 4 in the direction of an optical axis in such a way as to set the photo-taking lens 1 at the shortest focal length.

At a step S3, a luminance image is read in the following manner. The area sensor 10 is driven through the sensor driver 14 to perform a signal storing action. The distribution of luminance over the visual field, i.e., the distribution of illuminance over the image pickup planes 10a and 10b, is converted into image signals through the process of storing. After completion of the storing process, the image signals are read out. In reading the image signals, the A/D converter 11 is caused to act through the sensor driver 14 in synchronism with the timing of reading. The image signals outputted from the area sensor 10 are digitized by the A/D converter 11. The digital image signals thus obtained are supplied to the frame memory 12. A reading timing signal is given to the frame memory 12 via the sensor driver 14. The frame memory 12 then reads the digital image signals according to the reading timing signal.

An image indicative of the distribution of luminance (hereinafter referred to as a luminance image) is thus obtained from the area sensor 10 and is taken into the frame memory 12.

At a step S4, a distance image is formed as follows. The inside of each of the image pickup planes 10a and 10b is divided into a plurality of blocks. A distance between the images formed on the two image pickup planes 10a and 10b of the area sensor 10 is obtained for every one of the divided blocks one after another. The distance between the two images depends on the amount of defocus, and a value indicating an object distance can be obtained from the focal length and the focus position of the photo-taking lens 1, etc. The distribution of distances within an image plane, i.e., a distance image, is thus obtained. The details of the step of forming the distance image will be described later with reference to FIG. 7.

At a step S5, a main object is discriminated from other objects by extracting objects from the distance image obtained at the step S4. The details of the step of discriminating a main object will be described later with reference to FIG. 11.

At a step S6, a focal length is decided in the following manner. Information on the upper-end, lower-end, left-end and right-end positions of the main object recognized at the step S5 and the shape and size of the main object on the image plane at the current focal length of the photo-taking lens 1 is obtained. Then, a focal length $f_n$ of the photo-taking lens 1 at which the image of the main object will appear in an apposite size and in an apposite position on the phototaking image plane is obtained on the basis of the information.

At a step S7, the focal length $f_n$ obtained this time is compared with the focal length $f_{n-1}$ obtained the last time. If the focal length $f_n$ substantially coincides with the previous focal length $f_{n-1}$, the flow of operation comes to an end. If the focal length $f_n$ does not substantially coincide with the previous focal length $f_{n-1}$, the flow of operation comes to a step S8 for a zoom driving action.

At the step S8, the zoom driving action is executed in the following manner. The zoom motor driver 15 is caused to drive the zoom motor 16 in a predetermined direction for shifting the focal length of the photo-taking lens 1 to the focal length $f_n$ obtained at the step S6. The zoom motor 16 then causes, through cam means or the like, the variator lens 3 and the compensator lens 4 to move in the direction of the optical axis to shift the focal length of the photo-taking lens 1.

At a step S9 the previous focal length $f_{n-1}$ is changed to the current focal length $f_n$ to use the focal length $f_n$ as the previous focal length $f_{n-1}$ next time. The flow of operation then comes back to the step S3 to repeat the steps described above from the step S3.

Figure 12:
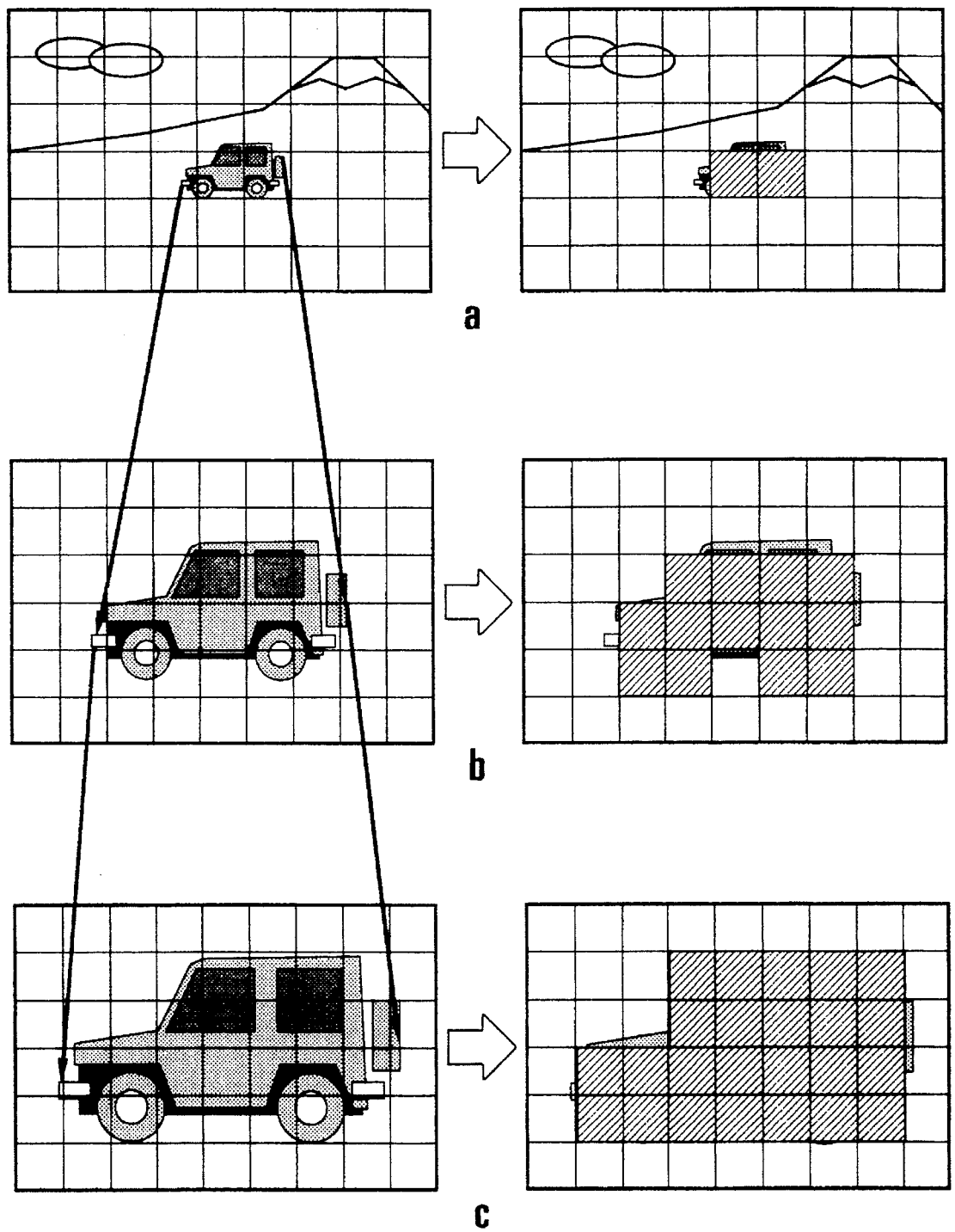
FIG. 12 shows the relation of the operation of the first embodiment to an image pickup field.

With the microcomputer 13 operating as described above, the automatic zooming action is performed, for example, as shown in FIG. 12. FIG. 12 shows, by way of example, the changes of the visual field caused by the operation of the first embodiment. Visual fields obtained at different focal lengths are shown on the left side of FIG. 12 together with the distance images divided by pixels. Shown on the right side of FIG. 12 is the main object indicated by hatching on each of the distance images. In FIG. 12, a part "a" shows the widest-angle visual field which is initially obtained. A part "b" shows a visual field which is decided on the basis of the main object detected in the widest-angle visual field "a" and is obtained by changing the field "a" by image pickup magnification varying means (the same as photo-taking magnification varying means which consists of the zoom motor driver 15, the zoom motor 16, etc., in this case). A part "c" shows a visual field which is decided on the basis of the main object detected in the previous visual field "b" and is obtained by changing the previous visual field by the image pickup magnification varying means. As shown in FIG. 12, a wide visual field is sighted at first to detect a main object of shooting. Next, the visual field is narrowed on the basis of the result of detection to improve the definition of the image of the main object and those of other parts around the main object. The main object is again detected with the improved definition. By this, the main object and its size, etc., are obtained with a high degree of definition so as to obtain an optimum visual field.

The details of the step S4 of FIG. 6 for forming the distance image are described below with reference to FIG. 7.

At a step S10, the initial setting of the position of a computation block is made by designating and setting an upper left end block (m, n) of FIG. 5 as (m, n)=(0, 0).

At a step S11, a correlation between the image of the computation block designated on the image pickup plane 10a and the image of an area on the image pickup plane 10b corresponding to the computation block designated is obtained. Then, a distance between two images which are most closely correlated is obtained. The distance between the two images depends on the amount of defocus, and a value indicating an object distance can be obtained from the focal length and the focus position of the photo-taking lens 1, etc. A distance to an object appearing in each of the designated computation blocks on the image pickup plane thus can be obtained by executing this step.

At a step S12, a check is made to find if the block which has been subjected to the computation is located in the lowest row on the image pickup plane 10a (m, N−1). If not, the flow of operation comes to a step S13. If so, the flow comes to a step S14.

At the step S13, a block to be subjected to the computation is set at a next (lower row) block (m, n+1) and the flow comes back to the step S11 for the computation.

At the step S14, a block to be subjected to the computation is set at a block (m, 0) of the uppermost row.

At the step S15, a check is made to find if the block which has been subjected to the computation belongs to the right end column (M−1, n). If not, the flow comes to a step S16. If so, the flow of operation for the formation of the distance image comes to an end.

At the step S16, a block to be subjected to the computation is set at a block (m+1, n) located in a next column on the right side. The flow then comes back to the step S11 for the computation.

In other words, the computing process begins with the computation block located at the upper left end. Upon completion of the computation on this block, the flow of computing process shifts to another block located in a next lower row. Upon completion of the computation on one whole column of blocks, the flow shifts to the uppermost row of a next column on the right side to resume the process of computation from that block vertically downward. Upon completion of the computation on a block of the lowest row of that column, the flow comes to a block of the uppermost row of another column located on the right side. The distance image is obtained by repeating the above computing process up to the computation on the block located at the lower right end.

The details of the step S11 of computing the amount of defocus (distance) are described with reference to FIG. 8 as follows.

At a step S20, a correlation between the image of a computation block designated on the image pickup plane 10a and the image of a corresponding area of the image pickup plane 10b is obtained as an amount of correlation by varying a distance between images in units of the pitch of pixels.

At a step S21, a distance between the images which shows a maximum degree of correlation is detected.

At a step S22, from the changes of the amount of correlation taking place in the neighborhood of the distance between the images indicating the maximum degree of correlation, an interpolating caluculation is carried out to obtain a distance between the images having the maximum degree of correlation at a degree of precision not exceeding the pitch of pixels.

At a step S23, a check is made to find if the contrast of luminance within the computation block has been sufficient for obtaining a discrepancy between the two images through the correlation of the two images. If not, the flow of the computing operation comes to an end. If so, the flow proceeds to a step S24.

At the step S24, a value indicating an amount of defocus and also a distance is obtained from the distance between the two images on the basis of information on optical characteristics, such as the focal length, the optical positional relationship, etc., of the photo-taking lens 1, the field lens 8 and the secondary image forming lenses 9. With this value obtained, the flow of the computing operation comes to an end.

Figure 9:
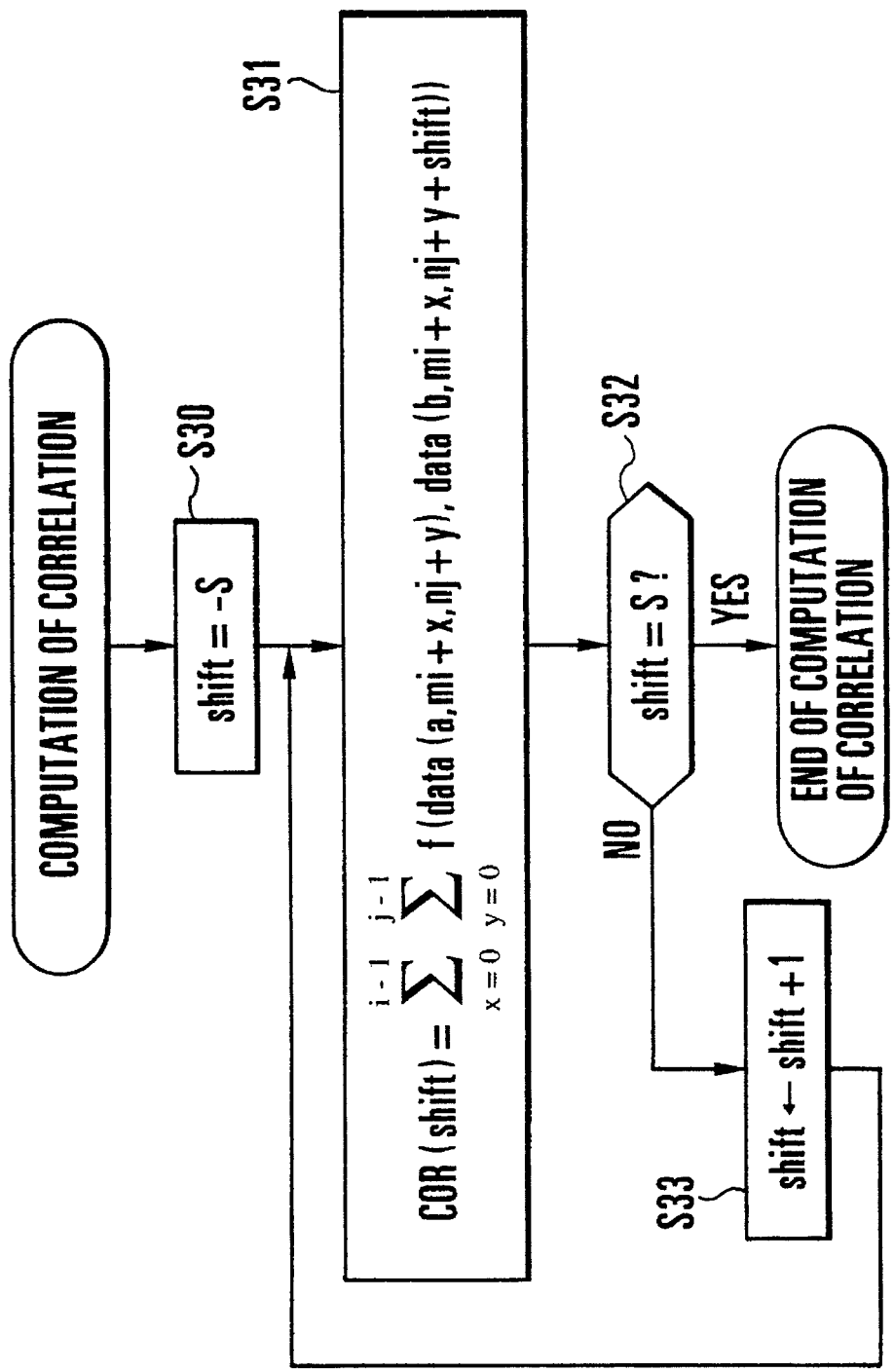
FIG. 9 is a flow chart showing the details of a step of computing a correlation shown in FIG. 8.

The details of the step S20 of computing the correlation are described below with reference FIG. 9.

At the step S30, the computation of correlation is performed as follows. The image obtained on the image pickup plane 10a is assumed to be a standard image, and the image on the other image pickup plane 10b is assumed to be a reference image. A position of a distance between images where an image which is ideally the same as the standard image is obtained when the photo-taking lens 1 is in focus on the photo-taking image plane is assumed to be a standard position. An amount of shift from the standard position (in units of the pitch of pixels) "shift" is set at a maximum amount of shift S which is a maximum possible amount of image discrepancy or a maximum detectable amount of image discrepancy. The computation of correlation is performed from a position which is deviated upward as viewed on FIG. 5 by the maximum amount of shift S.

At a step S31, an amount of correlation indicating a degree of correlation is calculated. The amount of correlation is calculated at each distance (amount of shift) in the following manner:

$$COR(\text{shift}) = \sum_{x=0}^{i-1} \sum_{y=0}^{j-1} f(\text{data}(a, mi+x, nj+y),$$
$$\text{data}(b, mi+x, nj+y+\text{shift}))$$

wherein data (image plane, horizontal position of pixel, vertical position of pixel)=the luminance value of a pixel indicated within ( ), and f=a function indicating the amount of correlation.

The function f which indicates the amount of correlation can be expressed, for example, by the following formula:

$$f(\text{data }(a, x0, y0), \text{data}(b, x0, y0)) = |\text{data}(a, x0, y0) - \text{data}(b, x1, y1)|$$

Figure 10:
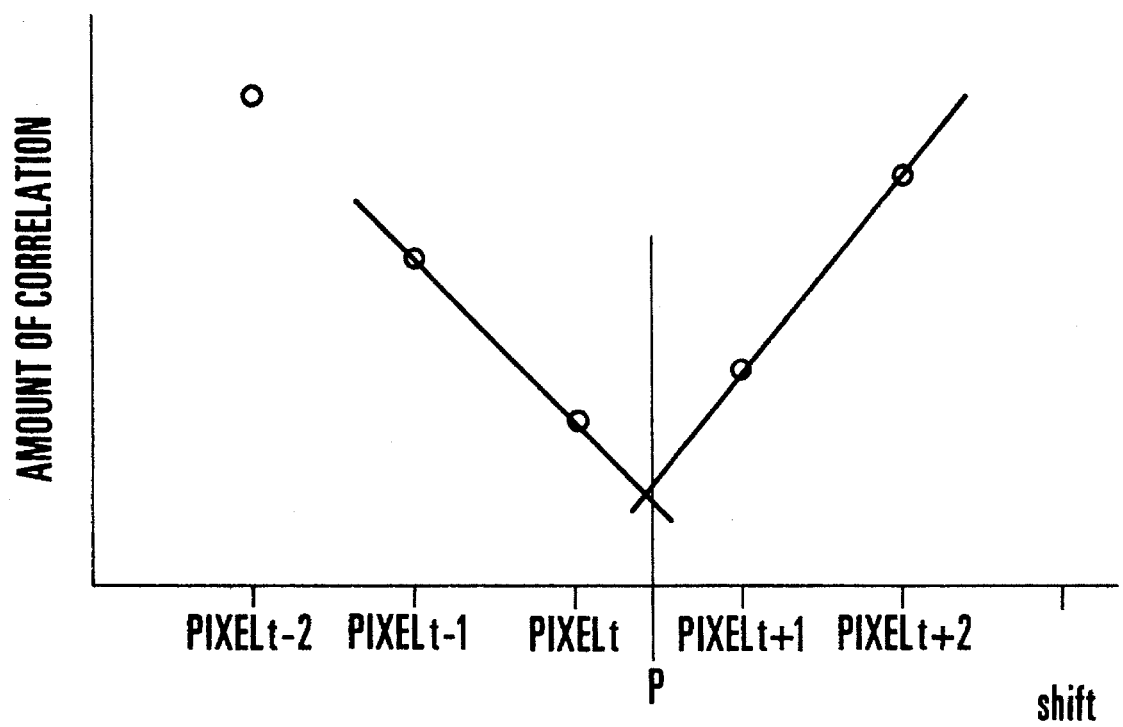
FIG. 10 is a graph showing a step of performing an interpolating computation shown in FIG. 8.

In a case where the amount of correlation is obtained by using the function f mentioned above, the step S22 of performing the interpolating computation is executed in such a way as to obtain the position of a point P shown in FIG. 10.

At a step S32, the flow of the computation of correlation comes to an end if the amounts of correlation have been obtained up to a position deviated downward as viewed on FIG. 5 by the maximum amount of shift S from the standard position. If not, the flow proceeds to a step S33.

At the step S33, "1" is added to the amount of shift "shift". In other words, as viewed on FIG. 5, a position to be used as the reference image is shifted downward to the extent of one pitch of pixels. The flow then comes to the step S31 for the calculation. The computation of correlation is performed in this manner.

Figure 6:
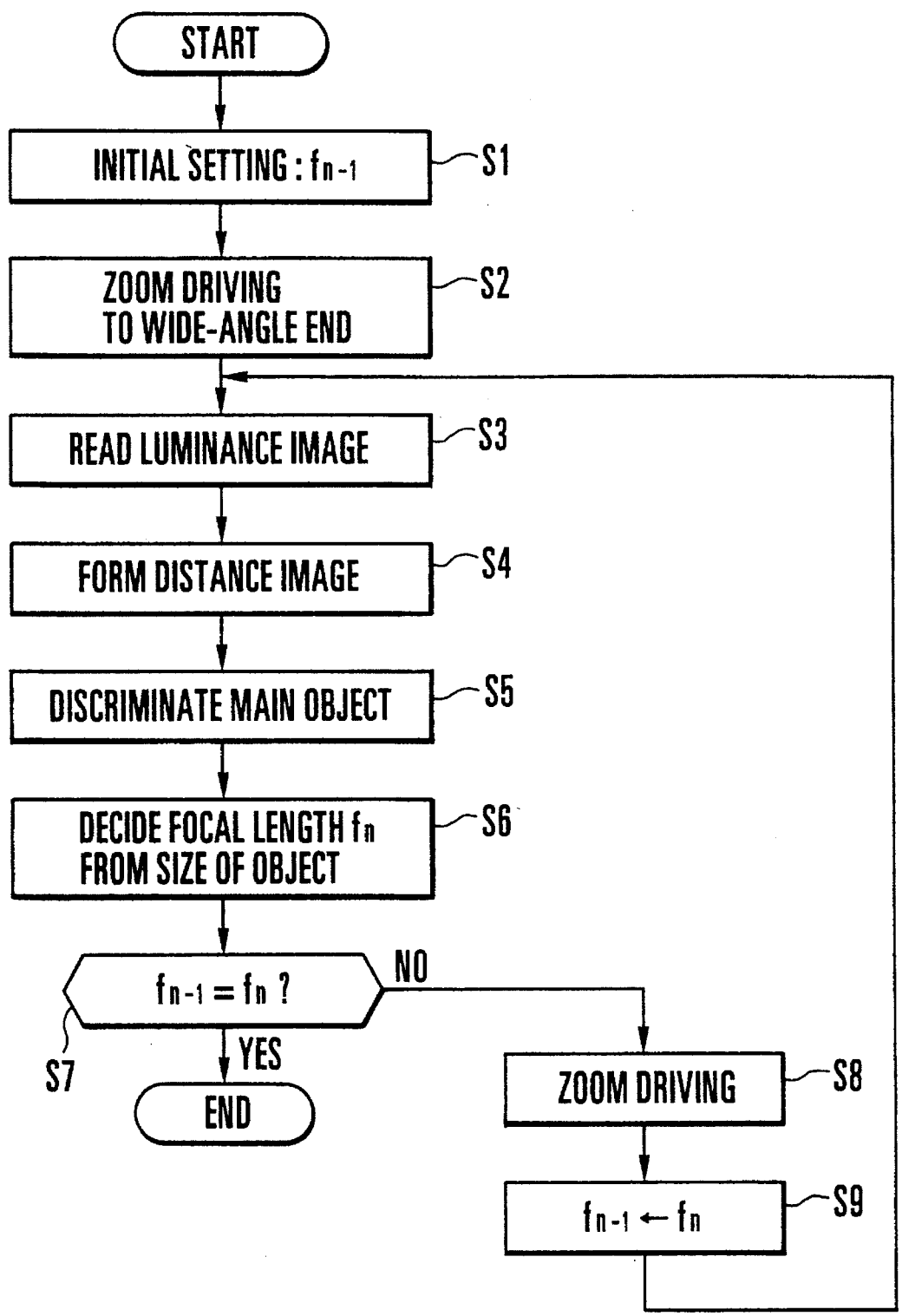
FIG. 6 is a flow chart showing the operation of a microcomputer of the first embodiment.
Figure 7:
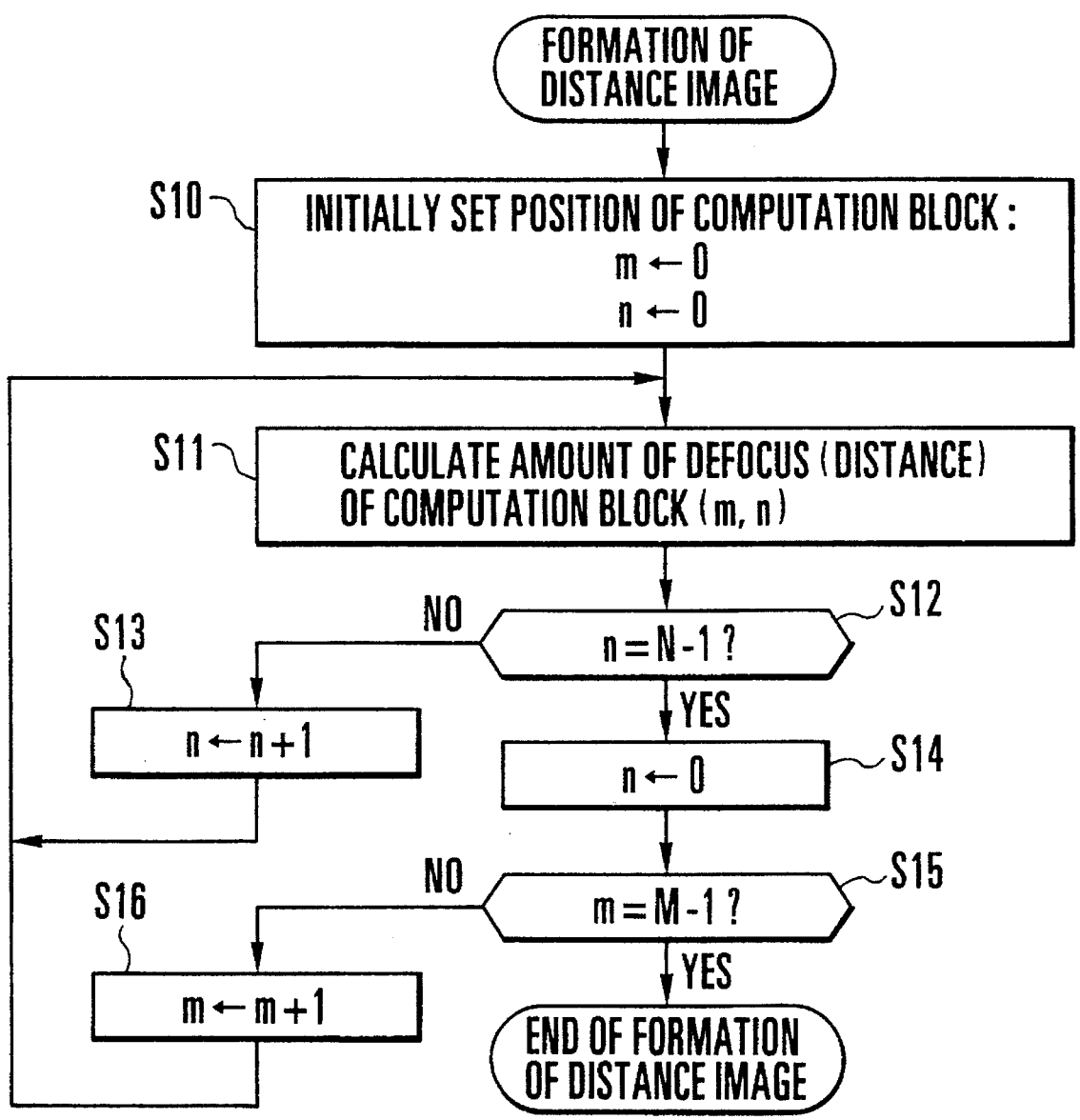
FIG. 7 is a flow chart showing the details of a step of forming a distance image shown in FIG. 6.

The details of the step S5 of discriminating a main object shown in FIG. 6 are described with reference FIG. 11 as follows.

At a step S40, the distance image obtained at the preceding step S4 is differentiated. In the case of an operator of 3×3 pixels, for example, the process of differentiation can be carried out using a differentiating operator which is as shown below:

$$((d(m-1, n-1) + d(m, n-1) + d(m+1, n-1) - $$
$$d(m-1, n+1) - d(m, n+1) - $$
$$d(m+1, n+1))^2 + (d(m-1,$$
$$n-1) + d(m-1, n) + d(m-1, n+1) - $$
$$d(m+1, n-1) - d(m+1, m) - $$
$$d(m+1, n+1))^2)^{1/2}, \text{ or}$$
$$d(m,n) - \min(d(m-1, n-1), d(m, n-1),$$
$$d(m+1, n-1), d(m-1, n), d(m+1, n),$$
$$d(m-1, n+1), d(m, n+1),$$
$$d(m+, n+1), \text{ or}$$

$$d(m,n) - (d(m-1, n-1) + d(m, n-1) + $$
$$d(m+1, n-1) + $$
$$d(m-1, n) + d(m+1, n) + d(m-1, n+1) + $$
$$d(m, n+1) + d(m+1, n+1))/8$$

At a step S41, a point where the absolute value of the differential value is equal to or greater than a predetermined value is detected.

At a step S42, the image area is divided at points where the absolute value of the differential value is equal to or greater than the predetermined value, so that each of objects is thus extracted.

At a step S43, an object located at a relatively near distance and located relatively near to the center of the photo-taking image plane is recognized as a main object. The step S5 of FIG. 6 of discriminating a main object then comes to an end.

Figure 11:
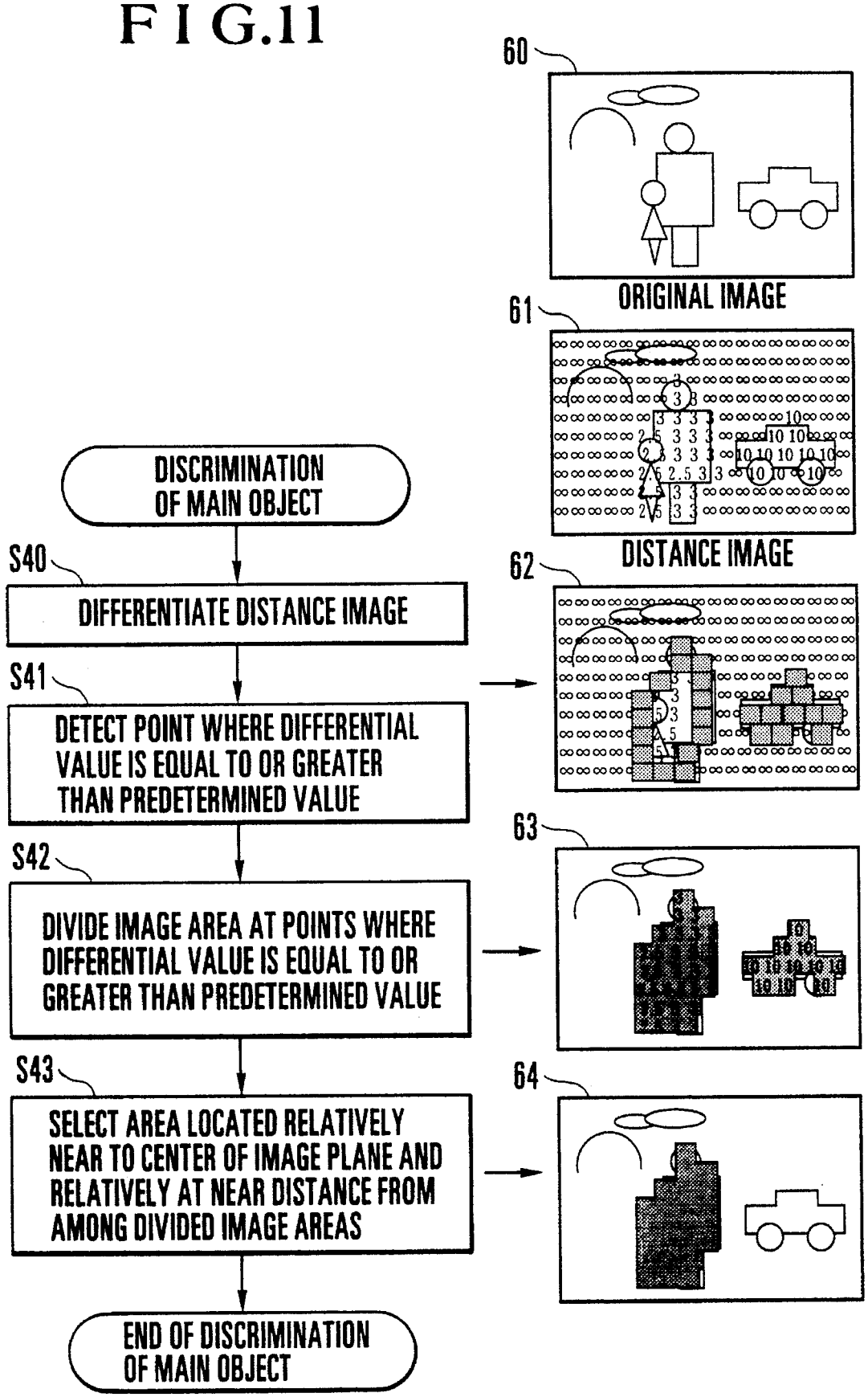
FIG. 11 shows the details of a step of discriminating a main object shown in FIG. 6.

In FIG. 11, parts 60 to 64 show by way of example the states of images processed by the above-stated steps executed for the step S5 of discriminating a main object. The part 60 shows an original image. The part 61 shows a distance image formed. The part 62 shows parts where the differential values of the differentiated distance image are detected at the step S41 to be equal to or greater than predetermined value. The part 63 shows the objects extracted at the step S42 by dividing the image area at points where the differential values are equal to or greater than the predetermined value. The part 64 shows by way of example an object recognized as the main object at the step S43.

(Second Embodiment)

Figure 13:
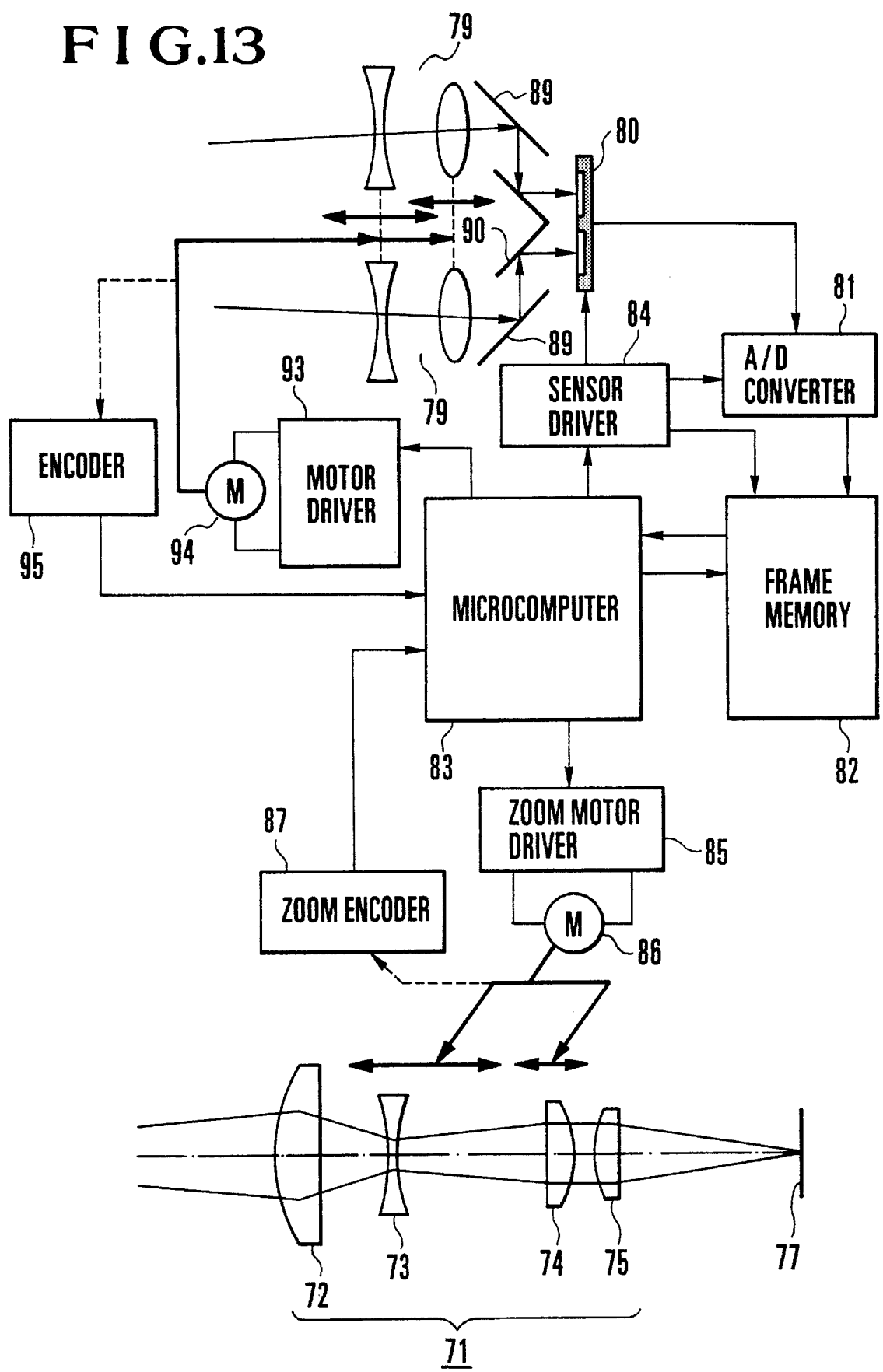
FIG. 13 is a block diagram showing an automatic zoom device of a camera arranged as a second embodiment of this invention.

FIG. 13 shows an automatic zoom device of a camera arranged as a second embodiment of this invention.

Referring to FIG. 13, the camera is provided with a photo-taking lens 71, which is composed of a focusing lens 72, a variator lens 73, a compensator lens 74 and a relay lens 75. The variator lens 73 and the compensator lens 74 are arranged to be driven in combination for zooming by a zoom motor 86 through a zoom cam ring which is not shown. Reference numeral 77 denotes a film surface.

A pair of image pickup lenses 79 are arranged to have a variable focal length and to form images on a pair of image pickup planes 80a and 80b of an area sensor 80 through reflection mirrors 89 and 90. The reflection mirrors 89 and 90 are arranged to guide image light fluxes from the pair of image pickup lenses 79 to the image pickup planes 80a and 80b of the area sensor 80. The area sensor 80 which has the pair of image pickup planes 80a and 80b as mentioned above is arranged to output image signals. An A/D converter 81 is arranged to convert the image signals into digital image signals. A frame memory 82 is arranged to store the digital image signals. A microcomputer 83 is arranged to control the area sensor 80, the A/D converter 81 and the frame memory 82 through a sensor driver 84, to obtain the image signals and to control zooming on the basis of the image signals thus obtained. The sensor driver 84 is arranged to operate, in accordance with the instructions from the microcomputer 83, to drive the area sensor 80, to give a conversion timing signal to the A/D converter 81 and to provide the frame memory 82 with the timing of taking data into the frame memory 82.

A zoom motor driver 85 is arranged to drive the zoom motor 86 in accordance with an instruction of the microcomputer 83 for a zooming action on the photo-taking lens 71. The zoom motor 86 is arranged to carry out the zooming action by driving the variator lens 73 and the compensator lens 74 through the zoom cam ring which is not shown. A zoom encoder 87 is provided for detecting the movement and position (focal length) of zooming. A motor driver 93 is arranged to drive a motor 94 to vary the variable focal length of the pair of image pickup lenses 79 in accordance with an instruction from the microcomputer 83. The motor 94 is arranged to drive the pair of image pickup lenses 79 to vary their variable focal length. An encoder 95 is provided for detecting the movement and position (focal length) of the pair of image pickup lenses 79.

Figure 14:
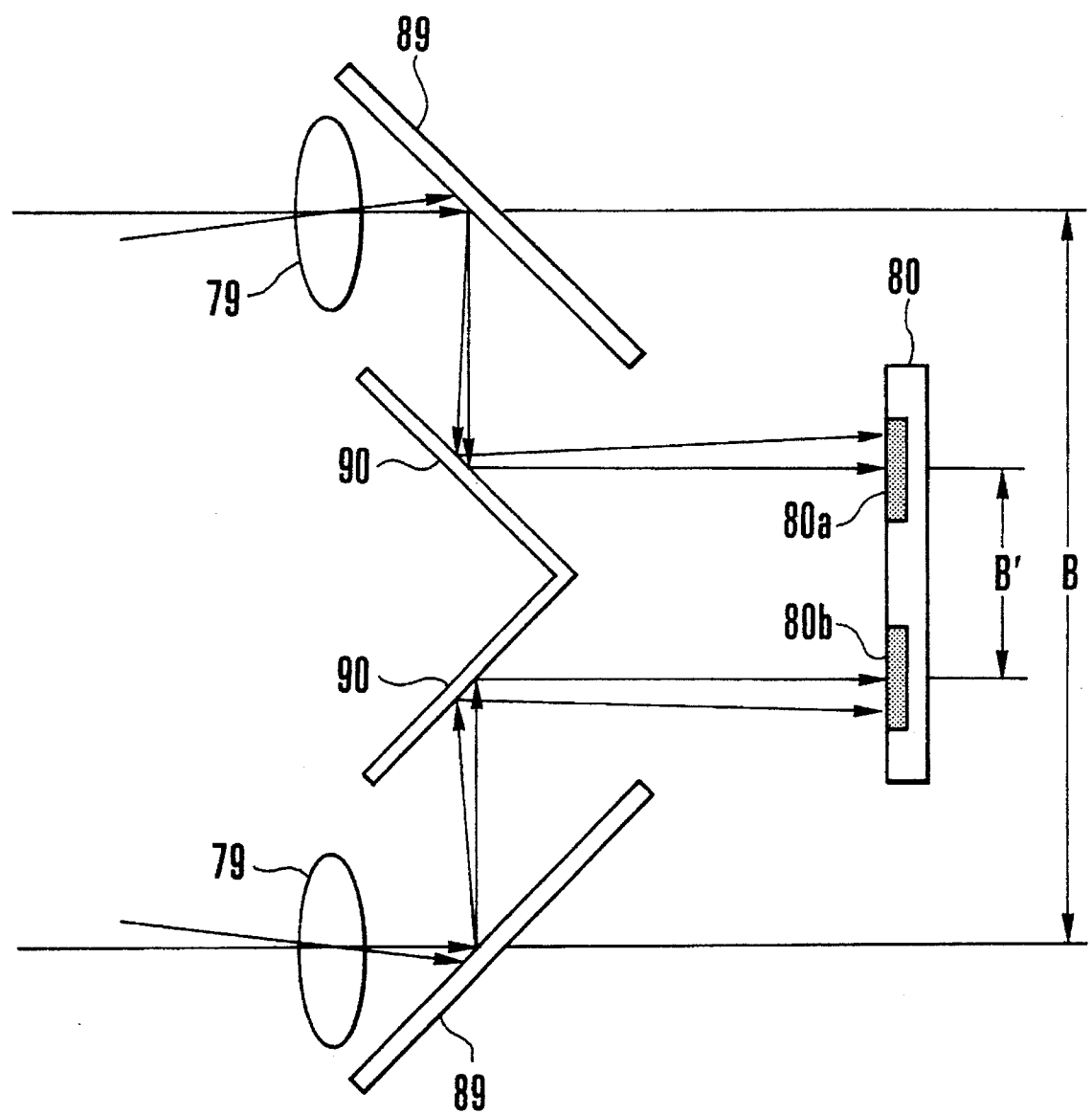
FIG. 14 shows the relation of optical positions of parts of the automatic zoom device of the camera arranged as the second embodiment of this invention.
Figure 15:
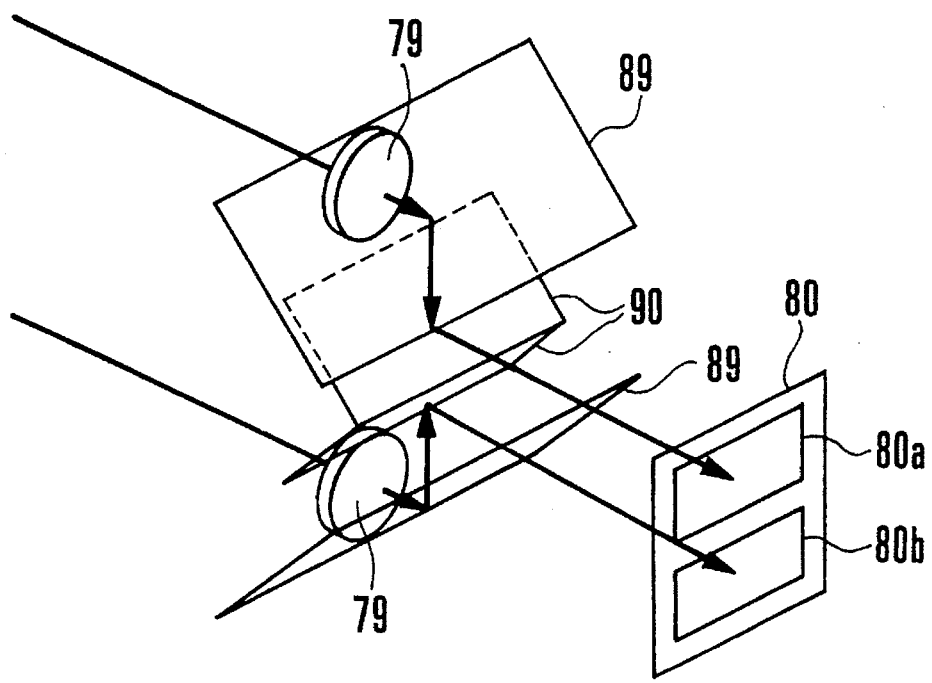
FIG. 15 shows in an oblique view the relation of optical positions of parts of the automatic zoom device of the second embodiment.

FIG. 14 shows the relation of optical positions of the reflection mirrors 89 and 90, the image pickup lenses 79 and the area sensor 80 of the automatic zoom device of the camera shown in FIG. 13. FIG. 15 shows the same relation in an oblique view. Referring to FIGS. 14 and 15, light fluxes which are separated as much as a base length B from each other are imaged respectively on the two image pickup planes 80a and 80b of the area sensor 80 through the image pickup lenses 79 and the reflection mirrors 89 and 90. In this instance, a distance between the two images formed on the pair of image pickup planes 80a and 80b depends on an optical distance f from the image pickup lenses 79 to the image pickup planes 80a and 80b, the base length B and an distance D to the object.

Figure 16:
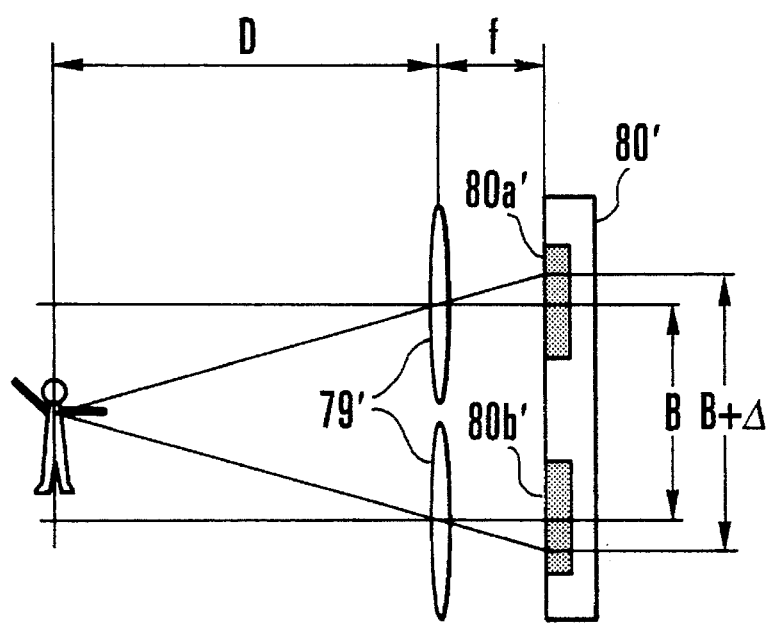
FIG. 16 shows the principle of a distance measuring operation of the second embodiment.

FIG. 16 shows the relation of the distance between the two images, the optical distance f from the image pickup lenses to the image pickup planes, the base length B, and the object distance D obtained in an arrangement simplified with the reflection mirrors 89 and 90 omitted. In the case of FIG. 14, the light fluxes which are separated as much as the base length B from each other are led by the reflection mirrors 89 and 90 to the image pickup planes 80a and 80b which are spaced as much as a distance B'. This arrangement can be considered to be equivalent to the arrangement shown in FIG. 16, wherein there are included only the image pickup planes 80a ' and 80b ' which are spaced a distance roughly equal to the base length B and the image pickup lenses 79' with the reflection mirrors 89 and 90 or anything corresponding to them excluded. The distance between the two images becomes equal to the base length B when the object is located at an infinity distance. This distance becomes wider by an amount Δ when the object is located at a finite distance.

The relation of the distance (B+Δ) between the two images, the optical distance f from the image pickup lenses to the image pickup planes, the base length B and the object distance D can be expressed by the following formula:

$$D/B = f/\Delta$$

The object distance, therefore, can be obtained from the distance between the two images.

Figure 17:
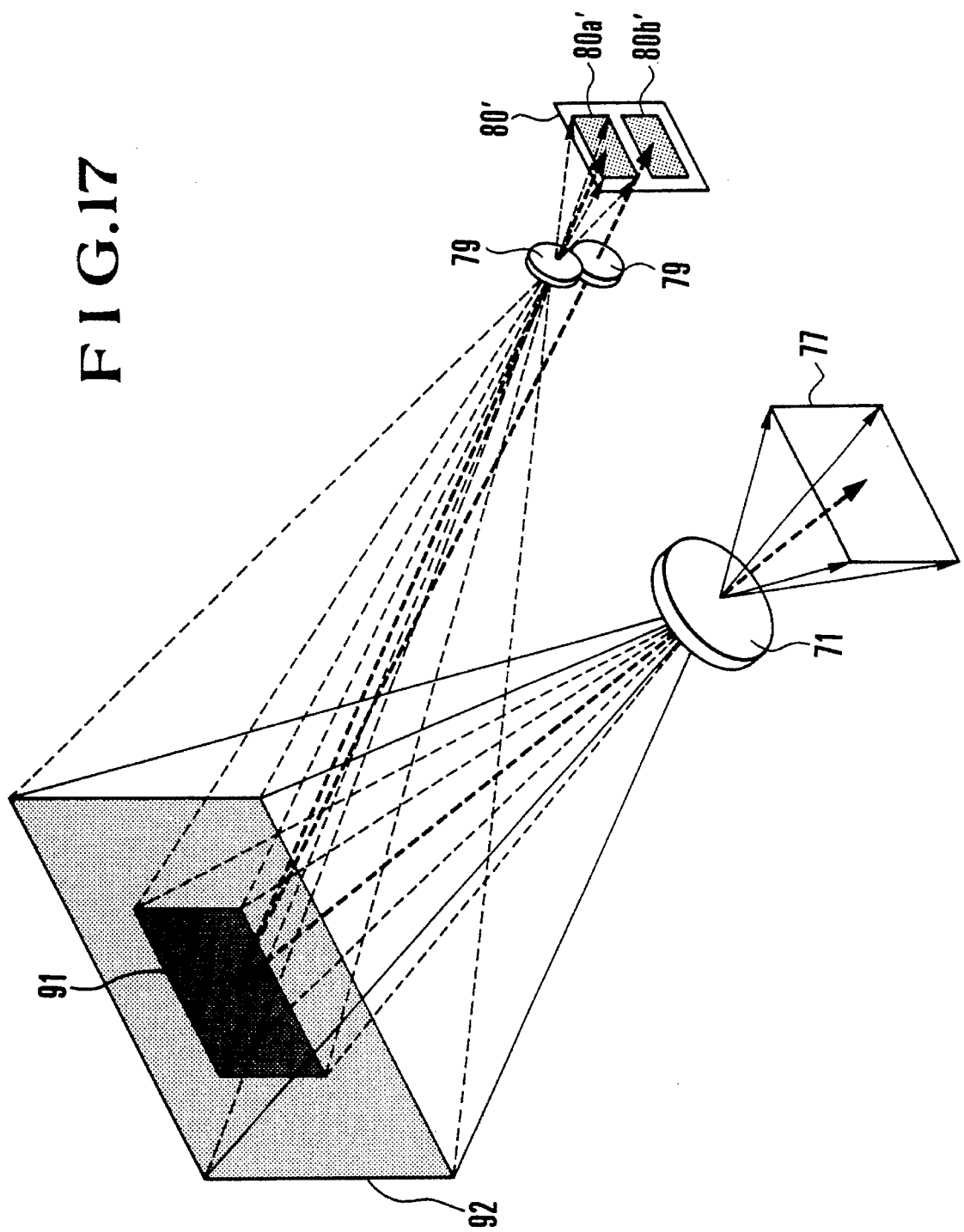
FIG. 17 shows a relation between a photo-taking field and an image pickup field in the second embodiment.

FIG. 17 shows the relation between a photo-taking field obtainable by the film surface 77 and the photo-taking lens 71 and an image-pickup field obtainable by the image pickup planes 80a' and 80b' and the image pickup lenses 79. In the case of FIG. 17, the relation of the visual fields, the image planes and the lenses is simplified, like in the case of FIG. 16, by excluding the reflection mirrors 89 and 90 from the arrangement. In FIG. 17, reference numerals 80', 80a' and 80b' denote the same parts as those shown in FIG. 16 while reference numerals 71, 77 and 79 denote the same parts as those shown in FIGS. 14 and 15. Reference numerals 91 and 92 denote the photo-taking fields obtainable by the photo-taking lens 71 and the film surface 77. The photo-taking field 91 is obtained when the photo-taking lens 71 is set by zooming at its longest focal length which is obtained in its telephoto end position. The photo-taking field 92 is obtained when the photo-taking lens 71 is set by zooming at its shortest focal length which is obtained in its wide-angle end position. The image-pickup field obtained by the image pickup lenses 79 and the image pickup planes 80a' and 80b' is approximately equal to the photo-taking field 92 of the wide-angle end when their variable focal length is at its shortest focal length, and is approximately equal to the photo-taking field 91 of the telephoto end when their variable focal length is at the longest focal length.

The arrangement of pixels on the image pickup planes 80a and 80b of the area sensor 80 is the same as the area sensor 10 of the first embodiment. In other words, each of the two image pickup planes 80a and 80b has X pixels horizontally arranged and Y pixels vertically arranged. Further, M computation blocks are horizontally arranged and N computation blocks are vertically arranged, each computation block including i pixels in the horizontal direction and j pixels in the vertical direction.

The microcomputer 83 shown in FIG. 13 performs control over the automatic zoom device as described below with reference to FIG. 18 which is a flow chart.

Figure 18:
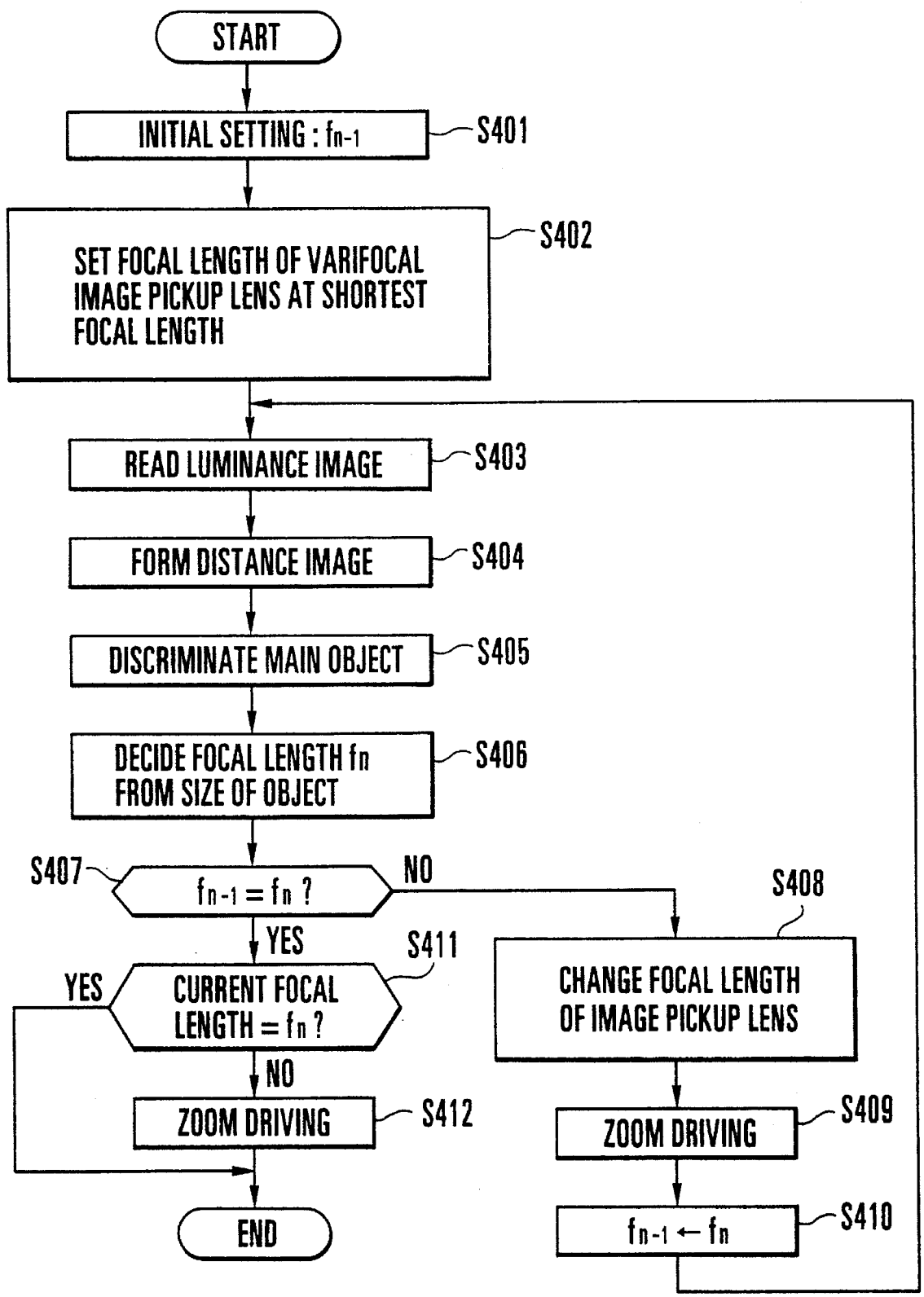
FIG. 18 is a flow chart showing the operation of a microcomputer of the second embodiment.

Referring to FIG. 18, at a step S401, data $f_{n-1}$ which indicates a focal length obtained the last time as apposite to the photo-taking lens 71 according to the size of the main object, etc., is shifted as initial setting to a value corresponding to the shortest focal length of the photo-taking lens 71.

At a step S402, the motor driver 93 is caused to drive the motor 94 to set the variable focal length of the image pickup lenses 79 at the shortest focal length to obtain an image-pickup field which is approximately equal to the photo-taking field 92 obtained when the photo-taking lens 71 is at its shortest focal length.

At a step S403, a luminance image is read in the following manner. The area sensor 80 is first driven through the sensor driver 84 to perform a signal storing action. The distribution of luminance over the visual field, i.e., the distribution of illuminance on the image pickup planes 80a and 80b is converted into image signals by photo-electric conversion and storing. Upon completion of the storing action, the image signals are read out. In reading, the A/D converter 81 is caused through the sensor driver 84 to act in synchronism with the timing of reading to digitize the image signals outputted from the area sensor 80. The digital image signals thus obtained are supplied to the frame memory 82. A reading-in timing signal is given through the sensor driver 84 to the frame memory 82 to have the digital image signals read into the frame memory 82.

At a step S404, a distance image is formed in the following manner. A distance between the images formed on the two image pickup planes 80a and 80b of the area sensor 80 is obtained from each of blocks which are defined by dividing the image pickup planes 80a and 80b respectively into a plurality of blocks. As mentioned in the foregoing, the distance between the two images (B+Δ) depends on the object distance D, and a value indicative of the the object distance D is obtainable from the optical distance f from the image pickup lenses 79 to the image pickup planes 80a and 80b and the base length B. The distribution of distance within the image plane, i.e., a distance image, thus can be obtained by this step. The details of this step of forming a distance image will be described later herein with reference to FIG. 19.

At a step S405, a main object is discriminated from others. Objects are extracted from the distance image obtained at the step S404. A main object is selected from these objects in the same manner as the main object discriminating step S4 of FIG. 6 which shows the first embodiment and also as described in detail in the foregoing with reference to FIG. 11

At a step S406, a focal length is decided in the following manner. Information about the shape and size of the image of the main object recognized at the step S405, in the visual field of image plane obtained at the current focal length of the image pickup lenses 79, is obtained by detecting the upper-end, lower-end, left-end and right-end positions of the main object image on the image plane. Then, a focal length $f_n$ of the photo-taking lens 71 at which the main object will appear in a suitable size and an apposite position within the photo-taking image plane and a focal length of the image pickup lenses 79 corresponding to the focal length $f_n$, are obtained.

At a step S407, the focal length $f_n$ currently obtained is compared with the focal length $f_{n-1}$ which has been obtained the last time. If they are substantially equal to each other, the flow comes to an end after executing steps S411 and S412. If not, the flow comes to a step S408. At the step S408, the focal length of the image pickup lenses is changed to a focal length at which an image-pickup field corresponding to the focal length $f_n$ of the photo-taking lens 71 decided at the step S406 is obtainable. For this purpose, the motor driver 93 is caused to drive the motor 94 in a predetermined direction to change the variable focal length of the image pickup lenses 79.

At a step S409, a zoom driving action is carried out in the following manner. The zoom motor driver 85 is caused to drive the zoom motor 86 in the predetermined direction to obtain the focal length $f_n$ which is decided at the step S406. The zoom motor 86 then changes the focal length of the photo-taking lens 71 by moving the variator lens 73 and the compensator lens 74 in the direction of the optical axis through a zoom cam ring which is not shown.

At a step S410, the data $f_{n-1}$ indicating a focal length obtained the last time is set at the value of the focal length f which is obtained this time to obtain data to be used next time as "data $f_{n-1}$ indicating a previously obtained focal length". The flow of operation then comes back to the step S403 to repeat the steps from the step S403.

At the step S411, a check is made to find if the current focal length of the photo-taking lens 71 is about equal to the focal length $f_n$ obtained this time. If so, the flow comes to an end without executing the step S412. If not, the flow comes to the step S412.

At the step S412, the zoom driving action is performed in the same manner as the step S409. The focal length of the photo-taking lens 71 is shifted to the focal length $f_n$ obtained at the step S406 by causing the zoom motor driver 85 to drive the zoom motor 86 in such a way as to move the variator lens 73 and the compensator lens 74 in the direction of the optical axis. The flow of operation then comes to an end.

With the microcomputer 83 arranged to operate as described above, the automatic zooming action is carried out by changing the image-pickup field as shown in FIG. 12 in the same manner as the first embodiment.

Figure 19:
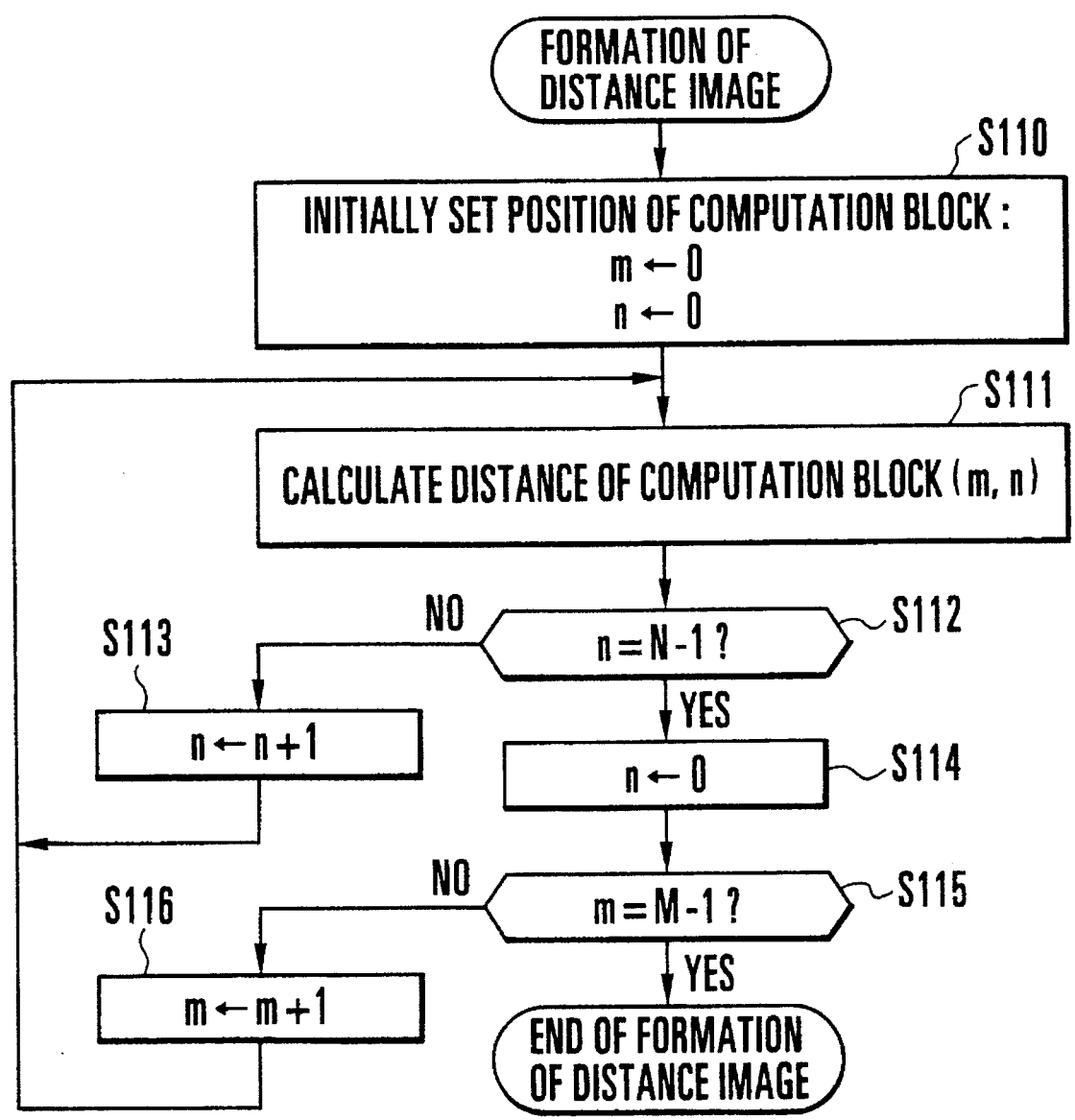
FIG. 19 is a flow chart showing the details of a step of forming a distance image shown in FIG. 18.

The details of the step S404 of FIG. 18 at which the distance image is formed are described with reference to FIG. 19.

At a step S110, as an initial setting position of computation blocks of the image pickup plane, the upper left end block (m, n) on the image pickup plane 10a shown in FIG. 5 is designated as (m, n)=(0, 0).

At a step S111, the correlation of the image of the designated computation block on the image pickup plane 80a and the image of an area on the other image pickup plane 80b corresponding to the designated computation block is obtained. A distance between the two images indicating the highest degree of correlation is thus obtained. The distance between the two images depends on the object distance, and a value indicative of the object distance is obtainable from the focal length f of the image pickup lenses 79 and the base length B. Therefore, a value indicating a distance to an object the image of which is located in the position of the designated computation block on the image pickup plane is thus obtained.

At a step S112, a check is made to find if the block subjected to the computing process is a block located in the lowest row (m, N-1) on the image pickup plane as viewed on FIG. 5. If not, the flow of operation comes to a step S113. If so, the flow comes to a step S114.

At the step S113, a block to be subjected to the computing process is shifted to a next (lower) block (m, n+1). The flow then comes to the step S111 to carry out the computing process.

At the step S114, the block to be subjected to the computing process is shifted to a block located in the highest row (m, 0). At a step S115, a check is made to find if the column to which the block subjected to the computing process is a right end column (M-1, n). If not, the flow comes to a step S116. If so, the flow comes to an end of the distance image forming operation.

At the step S116, the block to be subjected to the computing process is shifted to a block of the next column on the right side (m+1, n) and the flow comes to the step S111 to carry out the computing process.

In other words, the computing process for the formation of a distance image begins from the upper left end block. Upon completion of the computation on this block, the computing process shifts to another block located in a next lower row. Upon completion of the computation on a block located in the lowest row in one of columns, that is, when the computation on all blocks vertically aligned in one column is completed, the computing process is shifted to a block located in the uppermost row in a next column on the right side to vertically carry out the computing process from the uppermost block to the lowermost block one after another. Upon completion of the computation on the whole next column, the computing process is again shifted to the uppermost block of another column of blocks located on the right side. With the computing process repeated in this manner, it comes to an end upon completion of the computation on the block located at a lower right end. A distance image is obtained through this computing process.

Figure 20:
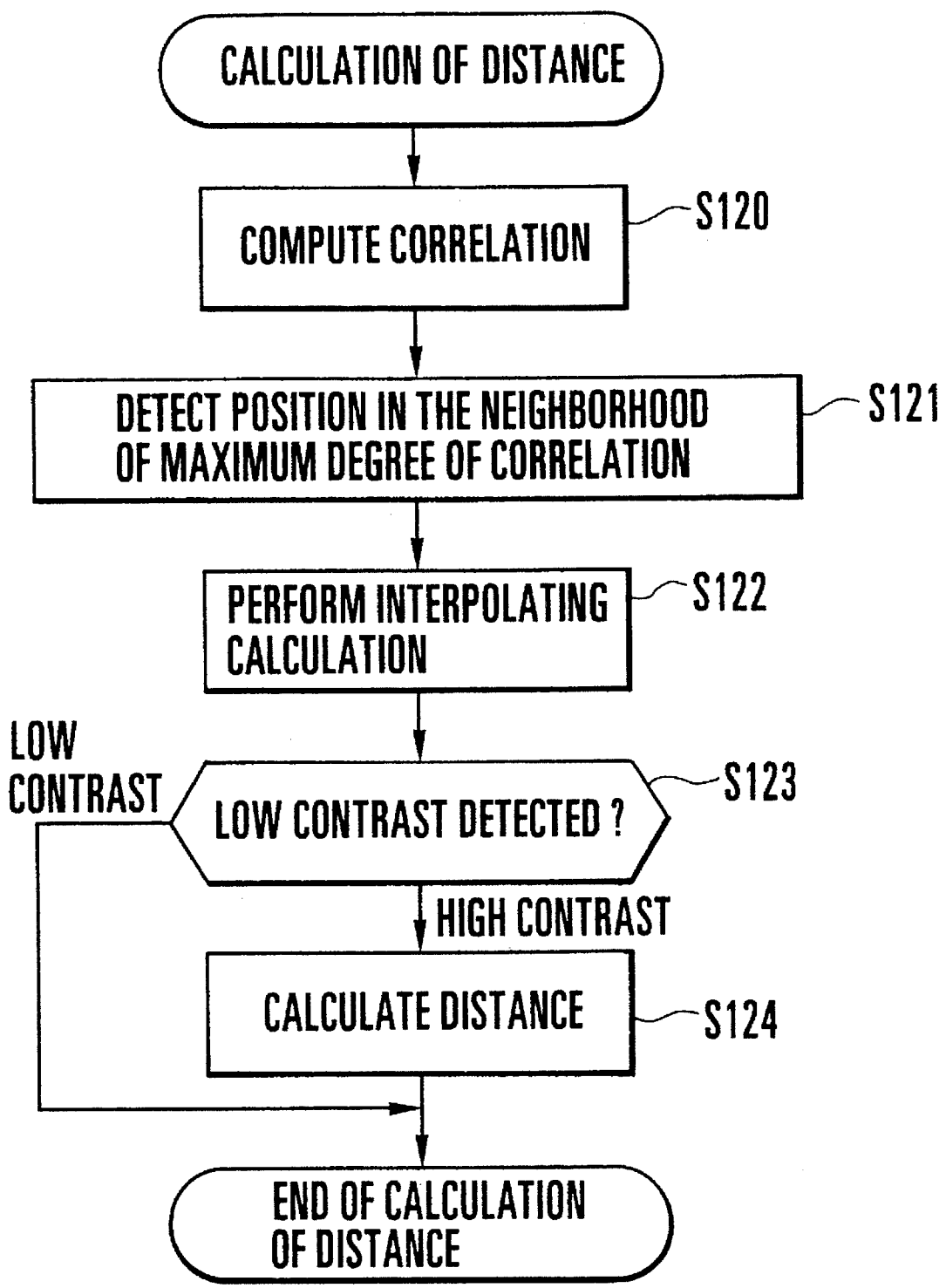
FIG. 20 is a flow chart showing the details of a step of calculating a distance shown in FIG. 19.

The details of the step S111 of computing an object distance are described with reference to FIG. 20.

At a step S120, the amount of correlation of an image obtained in the computation block designated on the image pickup plane 80a and an image obtained in the corresponding area of the other image pickup plane 80b is obtained by shifting the distance between the images in units of the pitch of pixels.

At a step S121, a distance between the images representing the highest degree of correlation is detected.

At a step S122, the distance between the images showing the highest degree of correlation is obtained by performing an interpolating calculation, at a degree of precision not exceeding the pitch of pixels, from the changes of the amount of correlation in the neighborhood of the distance between the images showing the highest degree of correlation.

At a step S123, a check is made to find if the luminance contrast within the computation block has been sufficiently high for detecting an image discrepancy by obtaining the correlation between two images. If not, the computing process comes to an end. If so, the flow of operation proceeds to a step S124.

At the step S124, a value indicating the object distance is obtained, from the distance between the two images obtained, on the basis of information on optical characteristics such as the focal length f of the image pickup lenses 79, etc., and the base length B. The computing process then comes to end.

Figure 21:
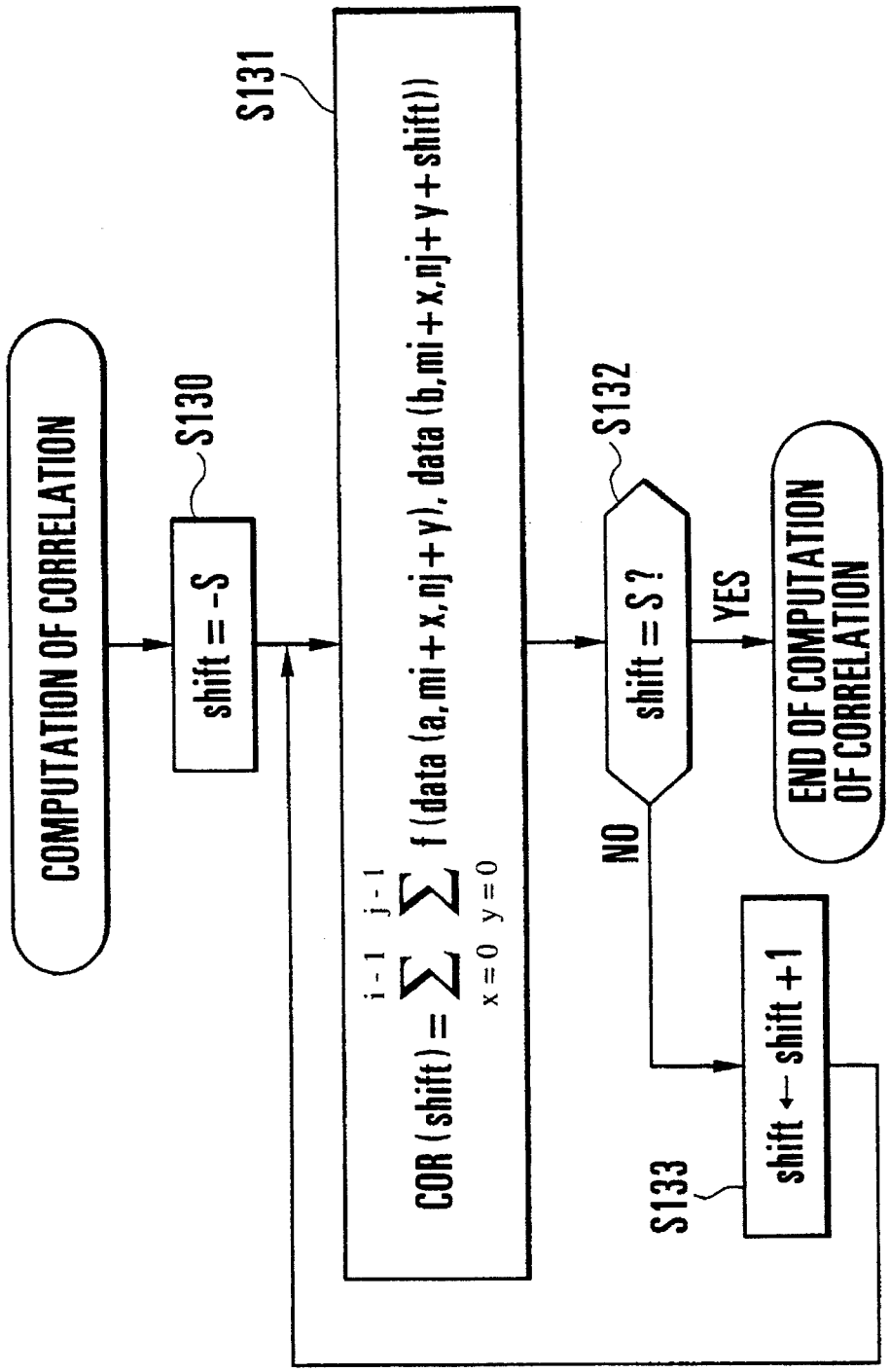
FIG. 21 is a flow chart showing the details of a step of computing a correlation shown in FIG. 20.

The step S120 of computing the correlation is further described with reference to FIG. 21.

At a step S130, the computation of correlation is performed as follows. The image pickup plane 80a is assumed to be a standard image plane. The image obtained on the image pickup plane 80a is assumed to be a standard image, and the image on the other image pickup plane 80b is assumed to be a reference image. A position of a distance between images where an image which is ideally the same as the standard image is obtained when the object distance is at a standard object distance is assumed to be a standard position. An amount of shift from the standard position (in units of the pitch of pixels) "shift" is set at a maximum amount of shift S which is a maximum possible amount of image discrepancy or a maximum detectable amount of image discrepancy. The computation of correlation is performed from a position which deviates upward as viewed on FIG. 5 by the maximum amount of shift S.

At a step S131, an amount of correlation indicating a degree of correlation is calculated. The amount of correlation is computed at each distance (amount of shift) in the following manner:

$$COR(\text{shift}) = \sum_{x=0}^{i-1} \sum_{y=0}^{j-1} f(\text{data}(a, mi+x, nj+y),$$
$$\text{data}(b, mi+x, nj+y+\text{shift}))$$

wherein data (image plane, horizontal position of pixel, vertical position of pixel)=the luminance value of a pixel indicated within ( ), and f=a function indicating the amount of correlation.

The function f which indicates the amount of correlation can be expressed, for example, by the following formula:

$$f(\text{data}(a, x0, y0), \text{data}(b, x0, y0)) = |\text{data}(a, x0, y0) - \text{data}(b, x1, y1)|$$

Figure 8:
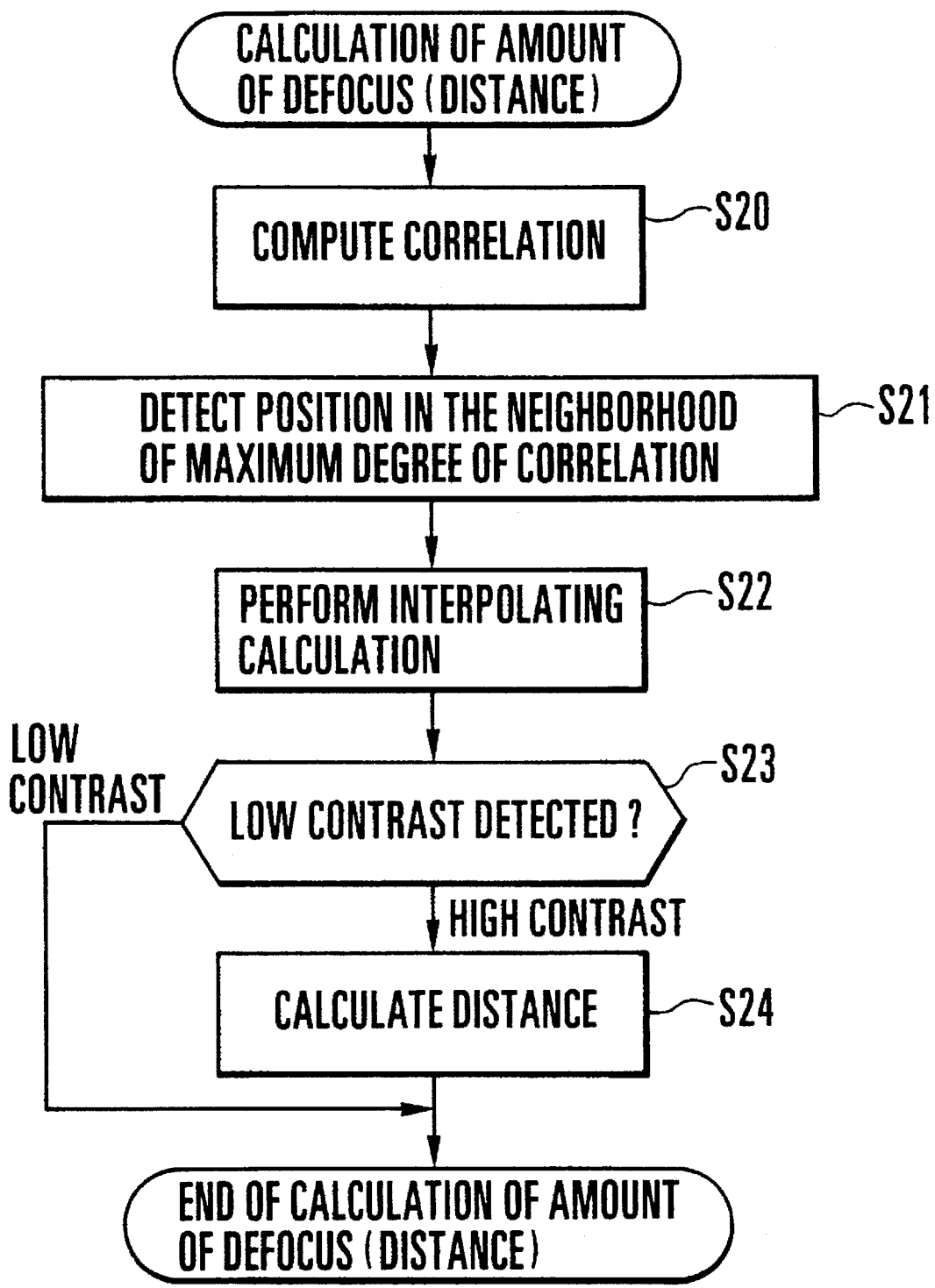
FIG. 8 is a flow chart showing the details of a step of calculating an amount of defocus shown in FIG. 7.

In a case where the amount of correlation is obtained by using the function f mentioned above, the step S122 of performing the interpolating calculation is executed to obtain the position of a point P shown in FIG. 10 in the same manner as the step S22 of FIG. 8 which shows the operation of the first embodiment.

At a step S132, the flow of the computation of correlation comes to an end if the amounts of correlation have been obtained up to a position deviated downward as viewed on FIG. 5 by the maximum amount of shift S from the standard position. If not, the flow proceeds to a step S133.

At the step S133, "1" is added to the amount of shift "shift". In other words, as viewed on FIG. 5, a position to be used as the reference image is shifted downward to the extent of one pitch of pixels. The flow then comes to the step S131 for the computation.

The correlation computing process is carried on by repeating the steps described above.

(Third Embodiment)

Figure 22:
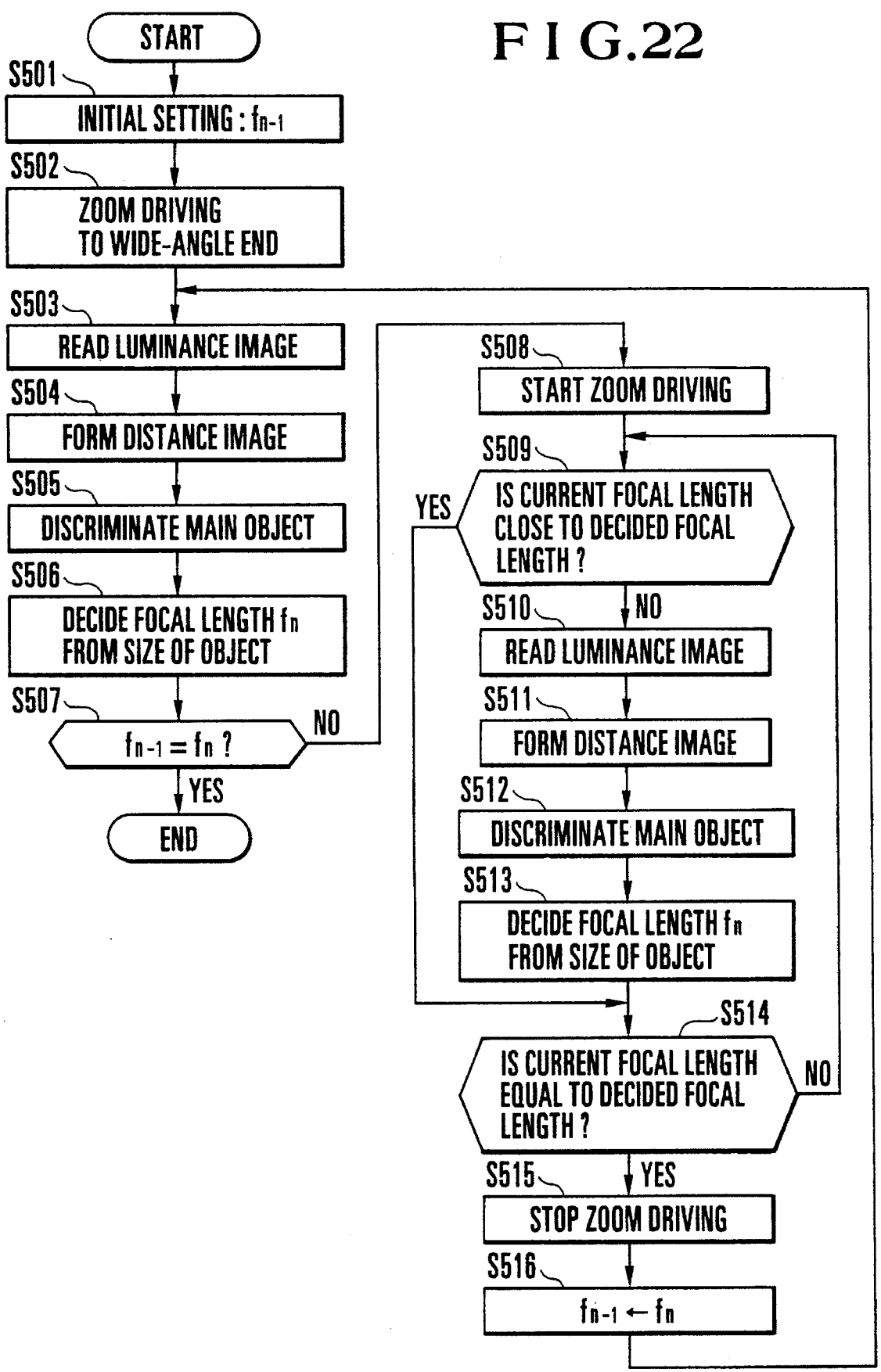
FIG. 22 is a flow chart showing the operation of a microcomputer of a third embodiment of this invention.

A third embodiment of this invention is arranged in the same manner as the arrangement shown in FIGS. 1 to 5. In the third embodiment, the microcomputer 13 is arranged to control the automatic zoom device as shown in FIG. 22 which is a flow chart. Referring to FIG. 22, the automatic zoom device operates as follows.

At a step S501 data $f_{n-1}$ indicating an apposite focal length which has been obtained the last time for the photo-taking lens 1 according to the size of a main object, etc., is set, as initial setting, at a value which corresponds to the shortest focal length of the photo-taking lens 1.

At a step S502, the zoom motor driver 15 is caused to drive the zoom motor 16 to move, through cam means or the like, the variator lens 3 and the compensator lens 4 in the direction of the optical axis in such a way as to set the focal length of the photo-taking lens 1 at the shortest focal length.

At a step S503, a luminance image is read in the following manner. The area sensor 10 is driven through the sensor driver 14 to perform a signal storing action. The distribution of luminance over the visual field, i.e., the distribution of illuminance over the image pickup planes 10a and 10b, is converted into image signals through the process of storing. After completion of the storing process, the image signals are read out. In reading the image signals, the A/D converter 11 is caused to act through the sensor driver 14 in synchronism with the timing of reading. The image signals outputted from the area sensor 10 are digitized by the A/D converter 11. The digital image signals thus obtained are supplied to the frame memory 12. A reading timing signal is given to the frame memory 12 via the sensor driver 14. The frame memory 12 then reads the digital image signals according to the reading timing signal.

An image of the distribution of luminance, i.e., a luminance image, is thus obtained from the area sensor 10 and is taken into the frame memory 12.

At a step S504, a distance image is formed in the following manner. The inside of each of the image pickup planes 10a and 10b is divided into a plurality of blocks. A distance between the images formed on the two image pickup planes 10a and 10b of the area sensor 10 is obtained for every one of these divided blocks one after another. The distance between the two images depends on the amount of defocus, and a value indicating an object distance can be obtained from the focal length and the focus position of the photo-taking lens 1. The distribution of distances within an image plane, i.e., a distance image, is thus obtained. This step of forming the distance image is similar to the step S4 of FIG. 6 which shows the operation of the first embodiment and the details of this step are the same as what has been described with reference to FIG. 7 in the foregoing.

At a step S505, a main object is discriminated from other objects by extracting objects from the distance image obtained at the step S504. The step S505 of discriminating the main object is similar to the step S5 of FIG. 6 which shows the first embodiment. The details of the step S505 are the same as what has been described in the foregoing with reference to FIG. 11.

At a step S506, a focal length is decided in the following manner. Information on the upper-end, lower-end, left-end and right-end positions of the main object recognized at the step S505, i.e., the shape and size of the main object on the image plane, is obtained. Then, a focal length $f_n$ of the photo-taking lens 1 at which the image of the main object will appear in an apposite size and in an apposite position on the photo-taking image plane is obtained on the basis of the information.

At a step S507, the focal length $f_n$ obtained this time is compared with the focal length $f_{n-1}$ obtained the last time. If these focal lengths substantially coincide with each other, the flow comes to an end. If not, the flow comes to a step S508 for a zoom driving action.

At the step S508, the zoom driving action begins in the following manner. The zoom motor driver 15 is caused to drive the zoom motor 16 to move, through cam means or the like, the variator lens 3 and the compensator lens 4 from their current zoom position in the direction of the optical axis in such a way as to change the focal length of the photo-taking lens 1 to the focal length $f_n$ obtained at the step S506.

At a step S509, a check is made to find if the current zoom position deviates from a zoom position corresponding to the focal length $f_n$ by a value which is equal to or greater than a predetermined value. If so, the flow comes to execute steps S510 to S513 one after another. If not, the flow comes to a step S514 without executing the steps S510 to S513.

At the step S510, the luminance image is read in the following manner. The area sensor 10 is first driven through the sensor driver 14. The area sensor 10 is thus caused to perform its signal storing action and to photoelectrically convert the luminance distribution over the visual field, i.e., the illuminance distribution over the image pickup planes 10a and 10b, into image signals. Upon completion of the storing action, the image signals are read out from the area sensor 10. In reading, the A/D converter 11 is caused to operate through the sensor driver 14 in synchronism with the timing of the reading. The image signals outputted from the area sensor 10 are thus converted into digital signals by the A/D converter 11. The digital signals are supplied to the frame memory 12. A reading timing signal is given to the frame memory 12 via the sensor driver 14. The frame memory 12 reads the digital image signals according to the reading timing signal.

In this case, the time of beginning the storing action, the time of ending it and a zooming position (or focal length) are stored and computed. If some image is caused to change by zooming while the storing action is in process, it is decided at what focal length the image obtained by storing should be considered to have been obtained.

At a step S511, a distance image is formed in the same manner as the step S504. However, the focal length to be used for the process of the step S511 is a focal length previously obtained at the step S510 while the storing action is in process.

At a step S512, a main object is discriminated in the same manner as the step S505 by extracting objects from the distance image obtained at the step S511.

At a step S513, a focal length is decided as follows. The microcomputer 13 obtains information on the upper-end, lower-end, left-end and right-end positions, i.e., the shape and size, on the image plane, of the main object which is recognized at the step S512 and obtained with the photo-taking lens 1 at the focal length obtained at the step S510 during the storing process. Then, a focal length $f_n$ of the photo-taking lens 1 at which the image of the main object will appear in an adequate size and in an apposite position on the photo-taking image plane is decided according to the information.

At a step S514, a check is made to find if the current focal length of the photo-taking lens 1 is substantially equal to the focal length $f_n$. If so the flow comes to the step S515 to stop the zoom driving. If not, the flow comes to the step S509 to repeat the above-stated processes from the step S509.

At the step S515, the zoom driving action which has begun at the step S508 is brought to an end.

At a step S516, the value of the focal length $f_n$ obtained this time is applied to the data $f_{n-1}$ which indicates the focal length obtained the last time to make it into the "data $f_{n-1}$ indicating the focal length obtained the last time" to be used next time. The flow then comes back to the step S503 to repeat the above-stated steps.

With the third embodiment arranged in the above-stated manner, in a case where the focal length deviates from a zooming position obtained from the image, an apposite focal length can be more quickly obtained by obtaining the image again and by renewing the focal length even when the zoom driving action is in process.

(Fourth Embodiment)

A fourth embodiment is arranged in the same manner as the arrangement of the first embodiment shown in FIGS. 1 to 5. In this case, however, the microcomputer 13 controls the automatic zoom device in accordance with procedures set forth in a flow chart shown in FIG. 23.

Figure 23:
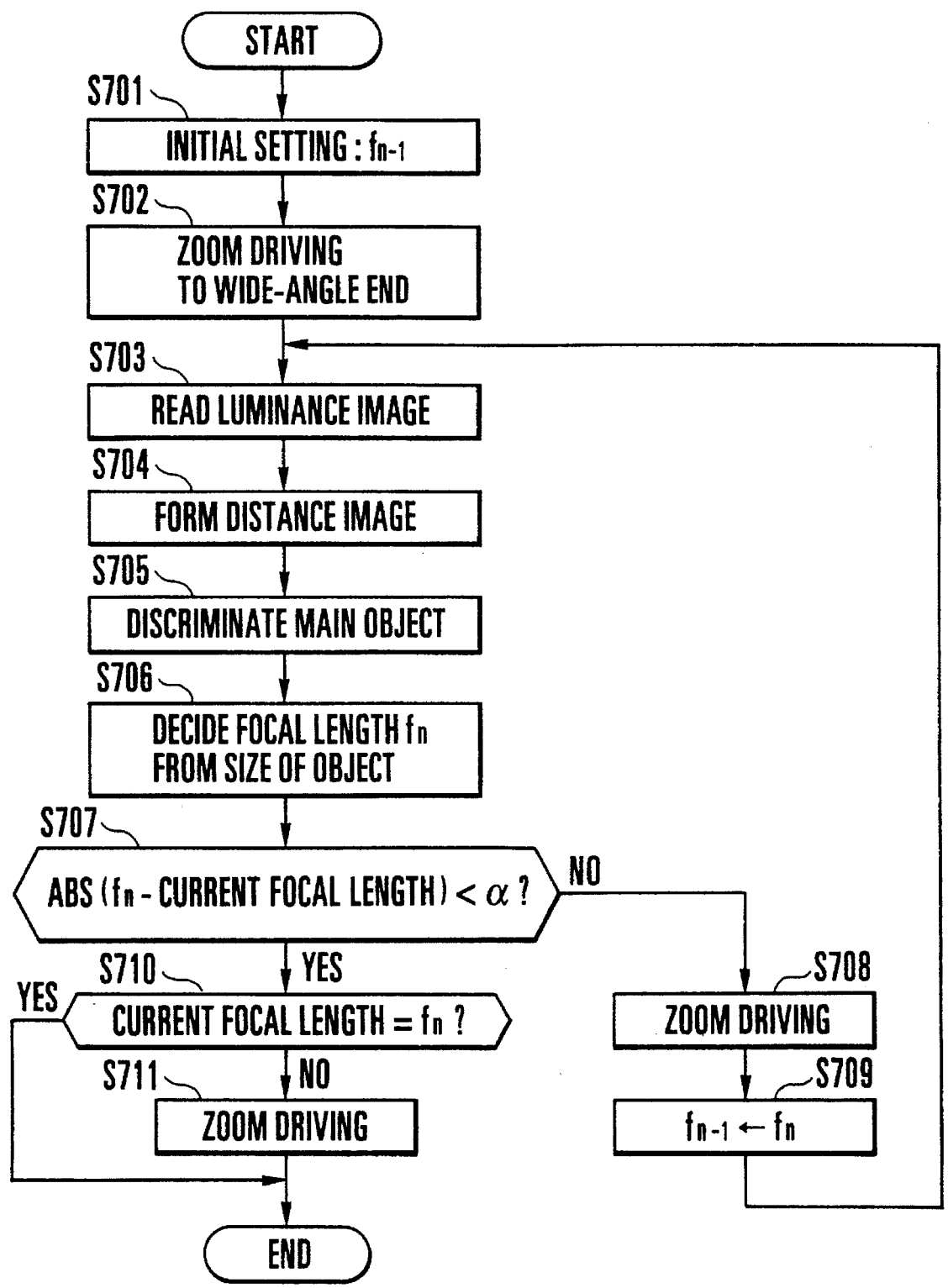
FIG. 23 is a flow chart showing the operation of a microcomputer of a fourth embodiment of this invention.

Referring to FIG. 23, the microcomputer 13 of the automatic zoom device operates as follows.

At a step S701, data "$f_{n-1}$" indicating an apposite focal length which has been obtained the last time for the photo-taking lens 1 according to the size of a main object, etc., is set, as initial setting, at a value corresponding to the shortest focal length of the photo-taking lens 1.

At a step S702, the zoom motor driver 15 is caused to drive the zoom motor 16 to move, through cam means or the like, the variator lens 3 and the compensator lens 4 in the direction of the optical axis in such a way as to set the photo-taking lens 1 at the shortest focal length.

At a step S703, a luminance image is read in the following manner. The area sensor 10 is driven through the sensor driver 14 to perform a signal storing action. The distribution of luminance over the visual field, i.e., the distribution of illuminance over the image pickup planes 10a and 10b, is converted into image signals through the process of storing. After completion of the storing process, the image signals are read out. In reading the image signals, the A/D converter 11 is caused to act through the sensor driver 14 in synchronism with the timing of reading. The image signals outputted from the area sensor 10 are digitized by the A/D converter 11. The digital image signals thus obtained are supplied to the frame memory 12. A reading timing signal is given to the frame memory 12 via the sensor driver 14. The frame memory 12 then reads the digital image signals according to the reading timing signal.

An image of the distribution of luminance (hereinafter referred to as a luminance image), is thus obtained from the area sensor 10 and is taken into the frame memory 12.

At a step S704, a distance image is formed as follows. The inside of each of the image pickup planes 10a and 10b is divided into a plurality of blocks. A distance between the images formed on the two image pickup planes 10a and 10b of the area sensor 10 is obtained for every one of these divided blocks one after another. The distance between the two images depends on the amount of defocus, and a value indicating an object distance can be obtained from the focal length and the focus position of the photo-taking lens 1. The distribution of distances within an image plane, i.e., a distance image, is thus obtained. The distance image is formed in the same manner as the step S4 of FIG. 6 which shows the first embodiment described in the foregoing. The details of the distance image are also the same as what has been described with reference to FIG. 7 in the foregoing.

At a step S705, a main object is discriminated from other objects by extracting objects from the distance image obtained at the step S704. The discrimination of a main object is made in the same manner as the first embodiment and is identical with the step S5 of FIG. 6.

At a step S706, a focal length is decided in the following manner: Information on the upper end, lower end, left end and right end positions of the main object recognized by the step S705 and the shape and size of the main object on the image plane is obtained. The a focal length $f_n$ of the photo taking lens 1 at which the image of the main object will appear in an adequate size and in an apposite position on the photo taking image plane is decided according to the information.

At a step S707, a value indicating the current focal length of the photo-taking lens 1 is compared with a value indicating the focal length $f_n$ obtained this time. If the value indicating the focal length $f_n$ is found to deviate from the value indicating the current focal length of the photo-taking lens 1 to an extent which is equal to or greater than a predetermined value α, the flow of operation proceeds to a step S708. If the former is found to be close to the latter, the flow comes to an end after the execution of steps S710 and S711.

The above-stated value indicating a focal length does not have to represent the focal length itself or to be proportional to the focal length. The value may be, for example, a drawing-out amount or a rotation amount of a zoom cam ring which is a part of cam means. Further, the amount of deviation of the value does not have to be expressed as a difference in the predetermined value but may be expressed, for example, in a ratio.

At a step S708, the zoom driving action is executed in the following manner. The zoom motor driver 15 is caused to drive the zoom motor 16 to move the variator lens 3 and the compensator lens 4 in the direction of the optical axis in such a way as to change the focal length of the photo-taking lens 1 to the focal length $f_n$ decided at the step S706.

At a step S709, the previous focal length $f_{n-1}$ obtained the last time is changed to the focal length $f_n$ obtained this time, so as to use the focal length $f_n$ as "the previous focal length $f_{n-1}$" next time. The flow of operation then comes back to the step S603 to repeat the steps described above from the step S603.

At the step S710, a check is made to find if the current focal length of the photo-taking lens 1 is substantially equal to the focal length $f_n$ obtained this time. If so, the flow comes to an end without executing the step S711. If not, the flow comes to the step S711.

At the step S711, the zoom driving action is executed like the step S709 in the following manner. The zoom motor driver 15 is caused to drive the zoom motor 16 to move the varator lens 3 and the compensator lens 4 in the direction of the optical axis through the cam means or the like in such a way as to change the focal length of the photo-taking lens 1 to the focal length $f_n$ decided at the step S706. The flow then comes to an end.

The microcomputer 13 operates as described above to carry out the automatic zooming action.

(Fifth Embodiment)

Figure 24:
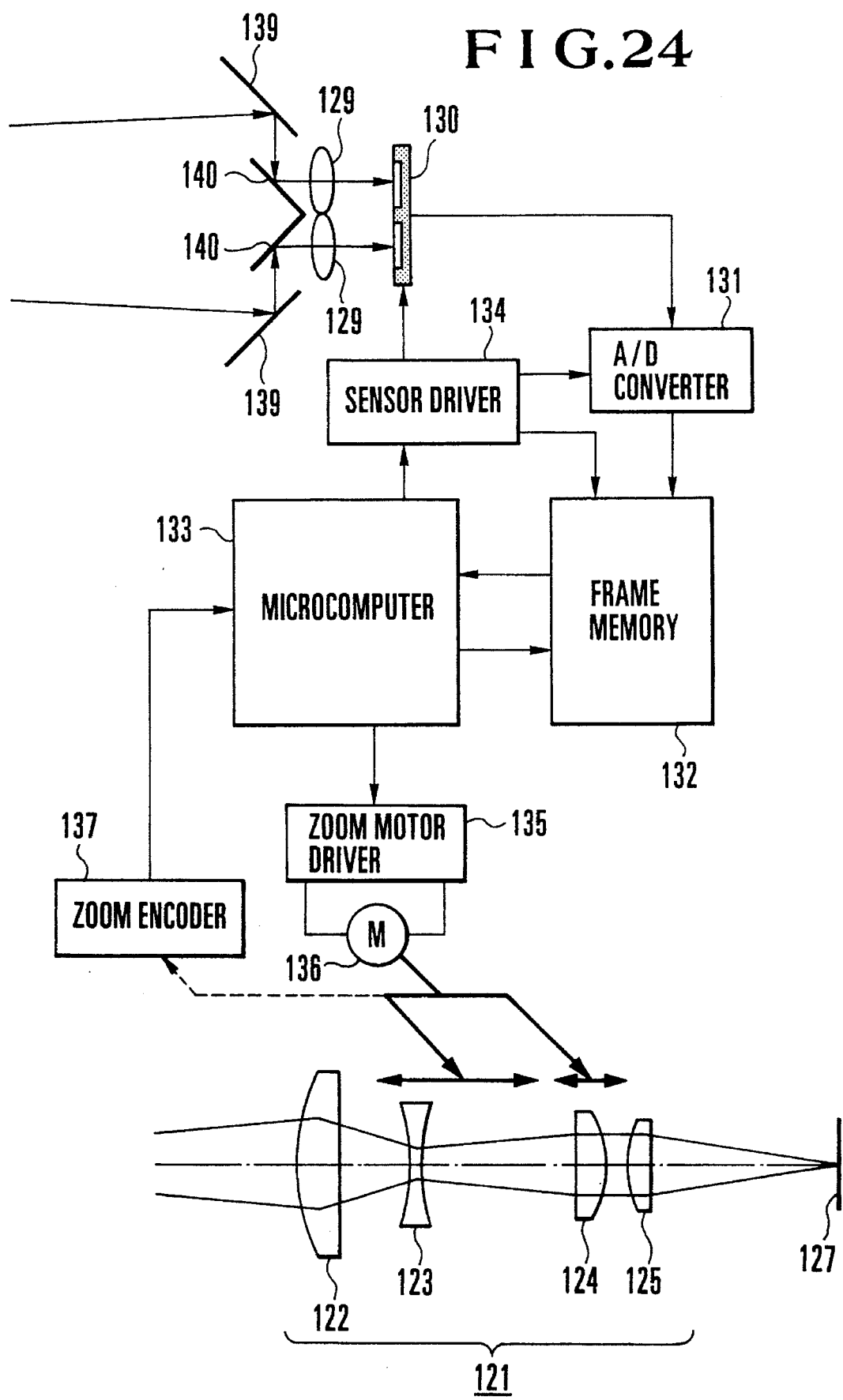
FIG. 24 is a block diagram showing an automatic zoom device of a camera arranged according to this invention as a fifth embodiment thereof.

FIG. 24 shows the automatic zoom device of a camera which is arranged according to this invention as a fifth embodiment thereof. Referring to FIG. 24, a photo-taking lens 121 includes a focusing lens 122, a variator lens 123, a compensator lens 124 and a relay lens 125. The variator lens 123 and the compensator lens 124 are arranged to be driven for zooming in the direction of an optical axis by a zoom motor 136 through a zoom cam ring which is not shown. Reference numeral 127 denotes a film surface. A pair of image pickup lenses 129 are arranged to have a focal length f and to form images respectively on a pair of image pickup planes 130a and 130b of an area sensor 130. Reflection mirrors 139 and 140 are arranged to guide incident light fluxes to the image pickup lenses 129 and to allow the pair of image pickup lenses 129 to have a base length B. The area sensor 130 is provided with the pair of image pickup planes 130a and 130b. An A/D converter 131 is arranged to digitize image signals outputted from the area sensor 130. A frame memory 132 is arranged to store the image signals digitized by the A/D converter 131. A microcomputer 133 is arranged to control the area sensor 130, the A/D converter 131 and the frame memory 132 through a sensor driver 134 to obtain the image signals and to control zooming on the basis of the image signals. The sensor driver 134 is arranged to operate, in accordance with the instructions from the microcomputer 133, to drive the area sensor 130, to give a conversion timing signal to the A/D converter 131 and to provide the frame memory 132 with the timing of taking data into the frame memory 132. A zoom motor driver 135 is arranged to drive the zoom motor 136 to perform a zooming action on the photo-taking lens 121. The zoom motor 136 is arranged to move for zooming the variator lens 123 and the compensator lens 124 in the direction of an optical axis through a zoom ring which is not shown. A zoom encoder 137 is provided for detecting the movement and position of zooming.

Figure 25:
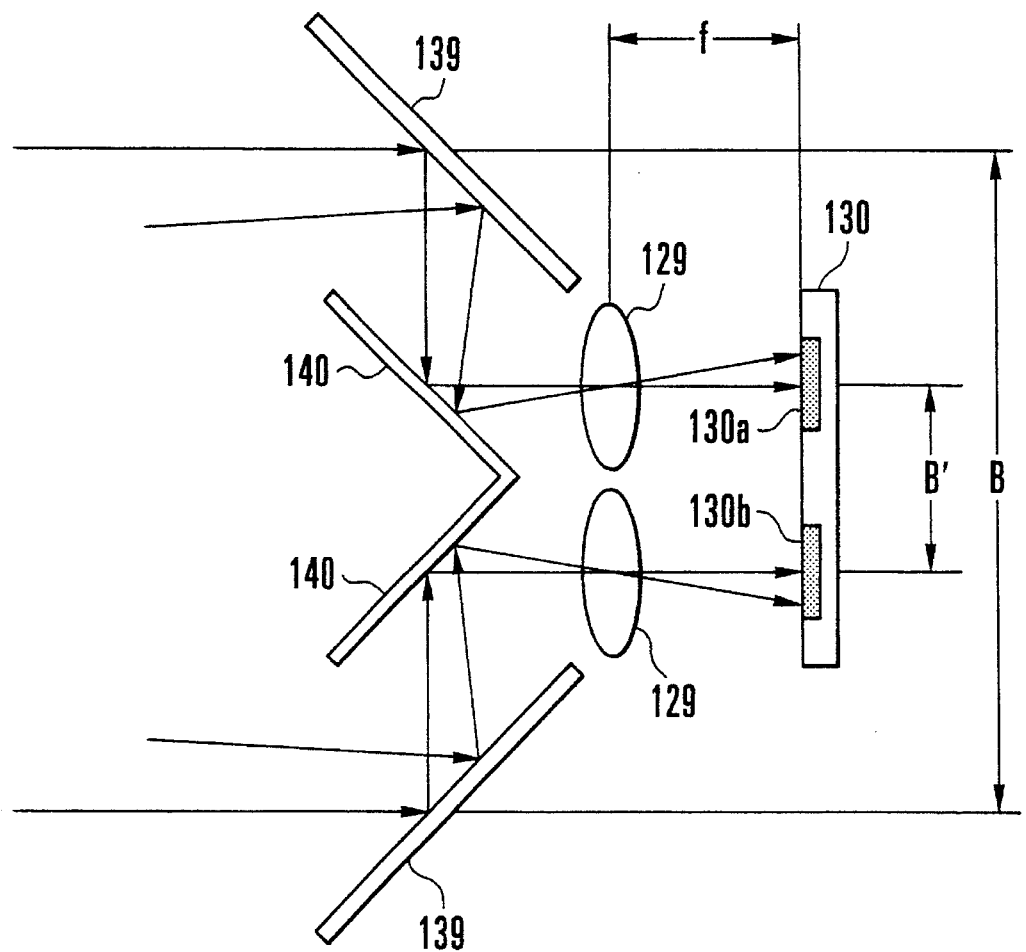
FIG. 25 shows the relation of optical positions of parts of the fifth embodiment of this invention.
Figure 26:
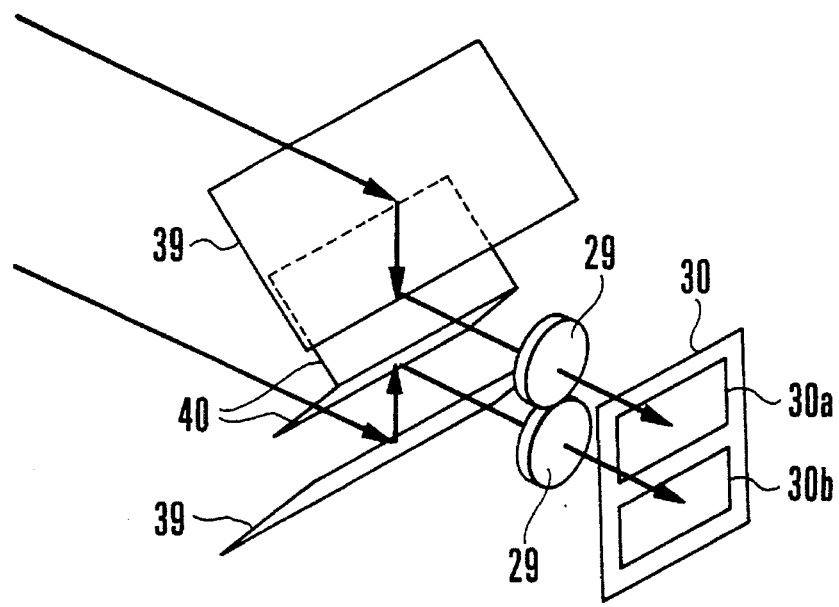
FIG. 26 shows in an oblique view the relation of optical positions of parts of the fifth embodiment.

FIG. 25 shows the relation of optical positions of the reflection mirrors 139 and 140, the image pickup lenses 129 and the area sensor 130 of the automatic zoom device of the camera. FIG. 26 shows the optical relation in an oblique view. Referring to FIGS. 25 and 26, light fluxes which are separated as much as the base length B from each other in the vertical direction, i.e., in the direction of the shorter side of the image plane are respectively guided by the reflection mirrors 139 and 140 to be imaged by the image pickup lenses 129 on the image pickup planes 130a and 130b of the area sensor 130. In this instance, a distance between the two images formed on the image pickup planes 130a and 130b depends on a distance from the image pickup lenses 129 to the image pickup planes 130a and 130b (which is approximately the focal length f of the image pickup lenses 129 and, hereinafter, this distance will be referred to as a focal length f), the base length B and an object distance D.

The fifth embodiment is arranged to act and operate in the same manner as the second embodiment with respect to the matters shown in FIGS. 16, 19, 20 and 21 and already described in the foregoing. Therefore, these matters are omitted from the following description.

In the case of the fifth embodiment, the main object discriminating operation is performed as shown in FIG. 27 which is a flow chart. Referring to FIG. 27, the main object discriminating operation is described. At a step S1200, a filter process is performed to smoothen the distance image.

The filter process is performed, for example, as follows. When a value indicating the distance of the computation block (m, n) which is regarded as a pixel of the distance image in forming the distance image is assumed to be α(m, n), and the pixel of the distance image obtained after the filter process is assumed to be d (m, n), the filter process can be carried out according to the following formula:

$$d(m,n) = \sum_{p=m-P}^{m+P} \sum_{q=n-Q}^{n+Q} A(p,q)$$

At a step S1201, a threshold value to be used for a binary coding by a next step S1202 is computed in the following manner. The threshold value is set either at the mean value d (m, n) of all the pixels or obtained, for example, by preparing a histogram (a part 173 in FIG. 27) of the values d (m, n) of the pixels of the image and by using a value obtained at a valley-shaped part existing on the near-distance side of the histogram.

At a step S1202, the value d (m, n) of each pixel of the image is binary-coded by using the threshold value obtained at the step S1201.

At a step S1203, the pixels having the binary-coded value of "1" are selected to discriminate a main object. The process of discriminating the main object then comes to an end.

Further, in FIG. 27, parts 170 to 174 show by way of example the states of images, etc., obtained in different stages of the main object discriminating process. The part 170 shows an original image. The part 171 shows a distance image formed. The part 172 shows a distance image obtained through the filter process of the step S1200. The part 173 shows the histogram of values d (m, n) indicating distances obtained at the pixels of the image and used in computing and obtaining the threshold value at the step S1201. The part 173 shows also the relation of the valley part on the near-distance side to the threshold value. The part 174 shows an object which is recognized as the main object through the binary coding process of the steps S1202 and S1203.

(Sixth Embodiment)

Figure 28:
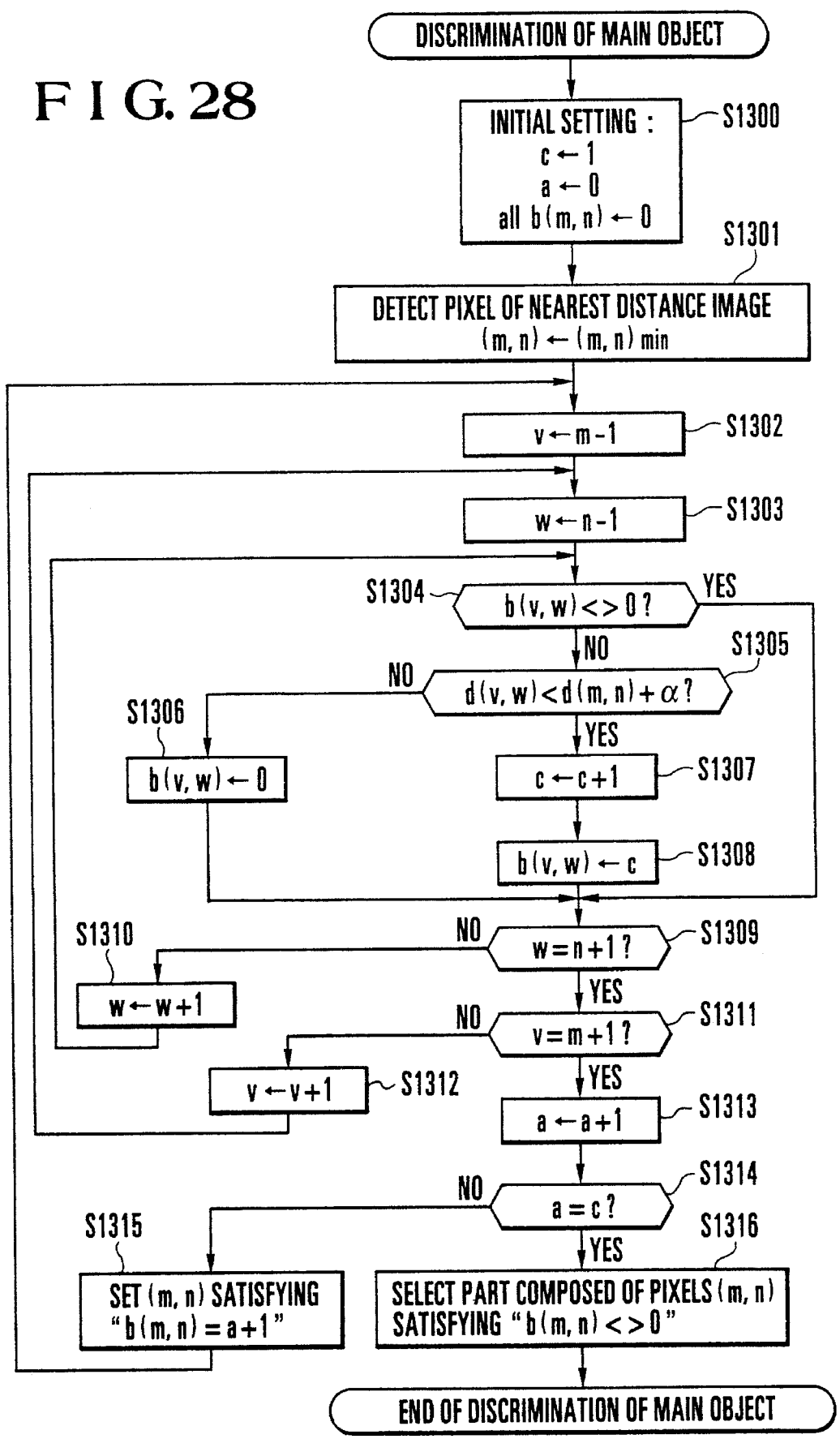
FIG. 28 is a flow chart showing the operation of a microcomputer of a sixth embodiment of this invention.

A sixth embodiment of this invention is described as follows with reference to FIG. 28 which is a flow chart.

At a step S1300, an initial setting action is performed for a main object discriminating process in the following manner. A serial number "c" of pixels selected as a lump is set at "1". The number "a" of pixels which are located around the lump and have been examined to find if they belong to the same lump is set at "0". Data b (v, w) which shows the attribute of a pixel is set at "0" for all the pixels.

At a step S1301, a pixel of a distance image representing the nearest object distance is selected at first.

At a step S1302, in a distance image formed on the area sensor as shown in FIG. 5, a column (v, *), wherein v=m−1, of pixels (computation block) located next to the selected pixel (m, n) on its left side is selected.

At a step S1303, a row (*, w), wherein w=n−1, of pixels (computation block) located immediately above the selected pixel (m, n) in the distance image formed on the area sensor as shown in FIG. 5 is selected.

At a step S1304, in a case where data b (v, w) showing the attribute of a designated pixel (v, w) is not "0", that is, if the pixel (v, w) has been selected as a pixel forming a lump, the flow of operation comes to a step S1309 by skipping steps S1305 through S1308.

At a step S1305, a check is made to find if the value d (v, w) indicating the distance of a designated pixel (v, w) which is one of pixels adjoining the selected pixel (m, n) deviates to an extent equal to or greater than a predetermined value α from a value d (m, n) indicating the distance of the selected pixel (m, n). If so, the flow comes to a step S1306. If not, the flow comes to a step S1307.

At the step S1306, with the distance of the pixel (v, w) found to be farther than that of the pixel (m, n) by more than the predetermined value α, the data b (v, w) indicating the attribute of the pixel (v, w) is set at "0" to indicate that the pixel is not forming the lump.

At the step S1307, with the distance of the pixel (v, w) found to be nearer than that of the pixel (m, n) by more than the predetermined value α, the serial number "c" of the pixels selected as the lump is incremented by one.

At a step S1308, the serial number "c" currently obtained is substituted for the data b (v, w) indicating the attribute of the pixel (v, w). As a result, the data b (v, w) which indicates the attribute becomes no longer "0" and comes to show the attribute of a lump-constituting pixel. The attribute of the pixel (v, w), i.e., whether the pixel is constituting the lump is judged through the process described above and is stored.

At a step S1309, a check is made to find if the data "w" which has been set as w=n−1 at the step S1303 at the beginning has become w=n+1, thus showing that the process has progressed to a next lower row on the area sensor as shown in FIG. 5. If so, the flow comes to a step S1311. If not, the flow comes to a step S1310.

At a step S1310, the value of the data w is incremented by one. In other words, the row to be processed is shifted downward by one row on the area sensor as shown in FIG. 5. The flow then comes back to the step S1304 to repeat the steps from the step S1304.

At a step S1311, a check is made to find if the data "v" which has been set as v=m−1 at the step S1302 at the beginning has become v=m+1, thus showing that the process has progressed to a next column on the right side on the area sensor as shown in FIG. 5. If so, the flow comes to a step S1313. If not, the flow comes to a step S1312.

At the step S1312, the value of data v is incremented by one. In other words, the column to be processed is shifted to the right by one column on the area sensor as shown in FIG. 5. The flow then comes to the step S1303 to repeat the steps from the step S1303.

All the pixels (v, w), wherein v=m−1, m, m+1; w=n−1, n, n+1, that surround the pixel (m, n) forming a lump are thus checked for their attributes to find if they are forming the same lump in the manner as described above.

At a step S1313, the number "a" of the pixels (v, w), wherein v=m−1, m, m+1; w=n−1, n, n+1, which have been checked for their attributes to find if they constitute the same lump at the steps up to the step S1312 is incremented by one. The flow then comes to a step S1314.

At the step S1314, a check is made to find if the number "a" of the surrounding pixels which have been checked for their attributes has reached the number "c" of lump-forming pixels. If not, the flow comes to a step S1315. If so, the flow comes to a step S1316.

At the step S1315, with the serial number "c" of the pixel to be selected as a lump found to be larger than the number "a" of the attribute-checked pixels, a pixel for which data b (m, n) indicating the attribute of an input pixel (m, n) is larger by "1" than the number "a" is detected. This pixel is selected as a pixel for a lump to be next processed. The flow then comes back to the step S1302 to repeat the steps from the step S1302.

At the step S1316, pixels for which the data b (m, n) is not "0" are selected. Then, an area indicated by these pixels is selected as a main object.

By the process described above, two pixels which are located adjacent to each other within the image plane and have a small difference in distance to the object between them are considered to form the same lump. Object are discriminated from each other by considering any part that shows a great change in distance to be a boundary of the lump. An object located at a near distance is selected as a main object from among others.

According to the arrangement of the embodiments of this invention described above, an object image is detected from an image signal. The size of a main object is judged from the object image. A photographic magnification (focal length) to be changed is decided on the basis of the size of the main object. Therefore, the photographic magnification can be always set in an optimum ratio not only according to the object distance but also on the basis of the size of the main object. The arrangement of making the image of the object into a distance image and considering a distance-changing part of the distance image to be a boundary between objects enables the camera to accurately and reliably discriminate a main object from a background without being confused by the patterns of contrast in luminance of the main object and the background.

Further, since the distance image is obtained on the basis of a discrepancy between two images having a parallax in the direction of the shorter side of the image pickup plane, a total length in the direction of the parallax which tends to become too long can be shortened. The distance image information, therefore, can be obtained by using a compact optical system. Further, since the main object discriminating action is accomplished by shifting the position of the focal-length varying optical system from a wide-angle end position toward a telephoto end position, a main object can be accurately detected from the whole photographable field.

Each of the embodiments described above is arranged to detect an object image with the focal length first set at the wide-angle end and then to detect the object image again by shifting the focal length toward the telephoto end. With the detecting process repeated in this manner, a photographing focal length can be accurately set on the basis of the size of the main object.

Further, each of the embodiments described above is arranged to change an object image into a distance image and to consider a distance-changing part of the distance image to be a boundary between objects. This arrangement enables the embodiment to be capable of accurately and reliably discriminating a main object from a background without being confused by the luminance contrast of the main object and that of the background.

While each of the embodiments has been described as being arranged to change an object image into a distance image for the purpose of recognizing objects, this invention is of course not limited to this arrangement. The advantage of this invention is likewise attainable by using, for example, a luminance image as the object recognizing image.

What is claimed is:

1. An optical apparatus comprising:

image pickup means having a pair of are sensors each of which is arranged to convert a light flux representative of an object image incident on said area sensor into an image signal;

object image detecting means for detecting information on the object image by using the image signal outputted from said pair of area sensors;

discriminating means for discriminating the size of a main object by using the information on the object image detected by said detecting means; and deciding means for deciding, on the basis of a discrimination made by said discriminating means, a focal length of an optical system to be changed.

2. An apparatus according to claim 1, wherein said detecting means is arranged to detect at least distance information on the object image, and wherein said discriminating means is arranged to discriminate the size of the main object by using the distance information.

3. An apparatus according to claim 2, wherein said discriminating means is arranged to discriminate the size of the main object by recognizing as a boundary portion of the main object a place at which the distance information changes.

4. An apparatus according to claim 2, wherein said detecting means is arranged to detect the distance information on each of image areas in said pair of area sensors on the basis of a discrepancy between images obtained in each of a plurality of image areas which have a parallax in the direction of a shorter side of an aspect ratio of said images.

5. An apparatus according to claim 3, wherein said detecting means is arranged to detect the distance information on each of image areas in said pair of area sensors on the basis of a discrepancy between images obtained in each of a plurality of image areas which have a parallax in the direction of a shorter side of an aspect ratio of said images.

6. An apparatus according to claim 1, wherein said image pickup means is arranged to convert, into the image signals outputted from said pair of are a sensors, the light flux representative of the object image which is provided by an optical system having a variable focal length.

7. An optical apparatus comprising:

image pickup means having a pair of area sensors each of which includes a plurality of image areas and is arranged to convert a light flux representative of an object image and incident on said image areas of said pair of area sensors into a plurality of distance images; and discriminating means for discriminating the size of a main object by using the distance images on the object image deriving from said pair of area sensors.

8. An apparatus according to claim 7, wherein said discriminating means is arranged to discriminate the size of the main object by recognizing as a boundary portion of the main object a place at which the distance images change.

9. An apparatus according to claim 7, wherein said image pickup means is arranged to convert, into the image signals outputted from said pair of area sensors, the light flux representative of the object image which is provided by an optical system having a variable focal length.

10. An optical apparatus comprising:

an optical system having a variable focal length;

image pickup means having a pair of area sensors each of which is arranged to convert a light flux representative of an object image and incident on said area sensor into an image signal;

object image detecting means for detecting information on the object image by using the image signals outputted from said pair of area sensors;

discriminating means for discriminating the size of a main object by using the information on the object image detected by said detecting means;

deciding means for deciding, on the basis of a discrimination made by said discriminating means, the focal length of said optical system to be changed; and driving means for driving said optical system in such a way as to set said optical system at the focal length decided by said deciding means.

11. An apparatus according to claim 10, wherein said deciding means is arranged to decide the focal length in such a way as to cause an image size of the main object to become a predetermined size.

12. An apparatus according to claim 10, wherein said image pickup means is arranged to convert, into the image signal outputted from said pair of area sensors, the light flux representative of the object image which is provided by said optical system.

13. An optical apparatus comprising:

an optical system having a variable focal length;

image pickup means having a pair of area sensors each of which is arranged to convert a light flux representative of an object image having a plurality of objects and incident on said area sensor into an image signal;

object image detecting means for detecting information on the object image by using the image signals outputted from said pair of area sensors;

driving means for varying the focal length of said optical system;

discriminating means for discriminating the size of a main object by using the information on the object image obtained when the focal length of said optical system is varied by an action of said driving means;

deciding means for deciding, on the basis of a discrimination made by said discriminating means, an image magnification to be changed; and control means for causing said driving means to act in such a way as to attain the image magnification decided by said deciding means.

14. An apparatus according to claim 13, wherein said detecting means is arranged to detect at least distance information on the object image, and wherein said discriminating means is arranged to discriminate the size of the main object by using the distance information.

15. An apparatus according to claim 14, wherein said discriminating means is arranged to discriminate the size of the main object by recognizing as a boundary between objects a place at which the distance information changes.

16. An apparatus according to claim 13, wherein said discriminating means is arranged to discriminate the size of the main object by using the information on the object image obtained when said driving means has varied the focal length of said optical system to a telephoto side.

17. An optical apparatus comprising:

a first optical system having a variable focal length;

a second optical system having a variable focal length;

image pickup means arranged to convert into an image signal a light flux representative of an object image which is led from said first optical system;

object image detecting means for detecting information on the object image by using the image signal outputted from said image pickup means;

first driving means arranged to vary the focal length of said first optical system;

second driving means arranged to vary the focal length of said second optical system;

discriminating means for discriminating the size of a main object by using the information on the object image obtained when said first driving means has varied the focal length of said first optical system;

deciding means for deciding, on the basis of a discrimination made by said discriminating means, an image magnification to be changed; and control means for causing said second driving means to act in such a way as to attain the image magnification decided by said deciding means.

18. An apparatus according to claim 17, wherein said detecting means is arranged to detect at least distance information on the object image, and wherein said discriminating means is arranged to discriminate the size of the main object by using the distance information.

19. An apparatus according to claim 18, wherein said discriminating means is arranged to discriminate the size of the main object by recognizing as a boundary between objects a place at which the distance information changes.

20. An apparatus according to claim 17, wherein said discriminating means is arranged to discriminate the size of the main object by using the information on the object image obtained when said first driving means has varied the focal length of said first optical system to a telephoto side.

* * * * *

UNITED STATES PATENT AND TRADEMARK OFFICE
CERTIFICATE OF CORRECTION

PATENT NO. : 5,615,398
DATED : March 25, 1997
INVENTOR(S) : Matsuyama, Shinichi

It is certified that error appears in the above-identified patent and that said Letters Patent is hereby corrected as shown below:

| | | | | |
|---|---|---|---|---|
| Col. 4, line 42, | delete | "into-a" | and insert | -- into a --. |
| Col. 7, line 63, | delete | "d(m+1,m)" | and insert | -- d(m+1,n) --. |
| Col. 7, line 67, | delete | "d(m+,n+1), or" | and insert | -- d(m+1,n+1), or --. |
| Col. 10, line 65, | delete | "FIG. 11" | and insert | -- FIG. 11. --. |
| Col. 11, line 33, | delete | "f" | and insert | -- $f_n$ --. |
| Col. 18, line 47, | delete | "α(m,n)" | and insert | -- Δ(m,n) --. |
| Col. 20, line 48, | delete | "Object" | and insert | -- Objects --. |
| Col. 21, line 34, | delete | "are" | and insert | -- area --. |
| Col. 22, line 5, | delete | "are a" | and insert | -- area --. |

Signed and Sealed this

Sixteenth Day of June, 1998

Attest:

BRUCE LEHMAN

*Attesting Officer*   *Commissioner of Patents and Trademarks*